US010657318B2

(12) United States Patent
Vennix et al.

(10) Patent No.: US 10,657,318 B2
(45) Date of Patent: May 19, 2020

(54) COMMENT NOTIFICATIONS FOR ELECTRONIC CONTENT

(71) Applicant: MICROSOFT TECHNOLOGY LICENSING, LLC, Redmond, WA (US)

(72) Inventors: Sophia Isabel Vennix, Seattle, WA (US); Benjamin Gustav Wilde, Quincy, MA (US); Kathleen Anna Cachel, Cambridge, MA (US); Anunaya Pandey, Watertown, MA (US); Raphael Jose Landaverde, Boston, MA (US)

( * ) Notice: Subject to any disclaimer, the term of this patent is extended or adjusted under 35 U.S.C. 154(b) by 0 days.

(21) Appl. No.: 16/052,064

(22) Filed: Aug. 1, 2018

(65) Prior Publication Data
US 2020/0042584 A1    Feb. 6, 2020

(51) Int. Cl.
*G06F 17/00*    (2019.01)
*G06F 40/169*   (2020.01)
*G06F 3/0482*   (2013.01)

(52) U.S. Cl.
CPC ......... *G06F 40/169* (2020.01); *G06F 3/0482* (2013.01); *G06F 2203/04804* (2013.01)

(58) Field of Classification Search
CPC ................. G06F 17/241; G06F 3/0482; G06F 2203/04804
See application file for complete search history.

(56) References Cited

U.S. PATENT DOCUMENTS

| | | | | |
|---|---|---|---|---|
| 5,671,428 A * | 9/1997 | Muranaga | ............... | G06Q 10/10 715/201 |
| 6,266,683 B1 * | 7/2001 | Yehuda | ................... | G06F 16/93 715/234 |
| 6,584,479 B2 * | 6/2003 | Chang | ................... | G06F 17/211 715/205 |
| 6,865,713 B1 * | 3/2005 | Bates | ................... | G06F 16/9577 715/233 |
| 7,130,885 B2 * | 10/2006 | Chandra | ................ | G06Q 10/10 709/206 |
| 7,194,679 B1 * | 3/2007 | Green | ................. | G06F 17/2247 715/233 |
| 8,291,014 B2 * | 10/2012 | Cierniak | ............... | G06F 16/958 709/203 |

(Continued)

OTHER PUBLICATIONS

"Add, Edit, Reply, or Delete Comments—Docs Editors Help", Retrieved From: https://support.google.com/docs/answer/65129?co=GENIE.Platform%3DDesktop&hl=en, Dec. 14, 2017, 4 Pages.

(Continued)

*Primary Examiner* — Laurie A Ries
(74) *Attorney, Agent, or Firm* — NovoTechIP International PLLC

(57) ABSTRACT

A comment management system and process for facilitating navigation of discrete segments of electronic content in which users can remain informed as to the comment context for the electronic content as a whole. This can provide collaborative document users the ability to more clearly distinguish comments for a currently viewed content portion from indicators for comments on previous or subsequent segments of content. The indicators can transition between a low visibility mode and a high visibility mode in response to user inputs.

20 Claims, 14 Drawing Sheets

(56) References Cited

U.S. PATENT DOCUMENTS

| | | | | |
|---|---|---|---|---|
| 8,656,266 | B2* | 2/2014 | Cierniak | G06F 16/951 715/206 |
| 8,745,506 | B2* | 6/2014 | Choudhary | G06F 9/451 715/739 |
| 8,996,621 | B2* | 3/2015 | Kleppner | G06F 17/241 709/206 |
| 9,063,637 | B2* | 6/2015 | Lisse | G06F 3/0483 |
| 9,064,237 | B2* | 6/2015 | Simons | G06F 17/2247 |
| 9,069,743 | B2* | 6/2015 | Kotler | G06F 17/241 |
| 9,087,032 | B1* | 7/2015 | Killalea | G06F 17/2241 |
| 9,135,602 | B2* | 9/2015 | Chegini | G06Q 10/10 |
| 9,460,416 | B2* | 10/2016 | Penner | G06Q 10/10 |
| 9,760,547 | B1* | 9/2017 | Brougher | G06Q 10/063 |
| 9,965,475 | B2 | 5/2018 | Gan et al. | |
| 10,296,577 | B1* | 5/2019 | Udell | G06F 17/246 |
| 2002/0099597 | A1* | 7/2002 | Gamage | G06Q 30/02 705/7.33 |
| 2006/0277523 | A1* | 12/2006 | Horen | G06F 8/73 717/106 |
| 2007/0011606 | A1* | 1/2007 | Bagheri | G06F 17/243 715/233 |
| 2008/0005284 | A1* | 1/2008 | Ungar | H04L 12/1859 709/219 |
| 2009/0100023 | A1* | 4/2009 | Inoue | G06F 17/2229 |
| 2009/0240606 | A1* | 9/2009 | Oakman | G06Q 10/00 705/30 |
| 2009/0254529 | A1* | 10/2009 | Goldentouch | G06F 17/241 |
| 2010/0095198 | A1* | 4/2010 | Bultrowicz | G06F 17/241 715/234 |
| 2011/0022942 | A1* | 1/2011 | Flemings | H04L 65/604 715/230 |
| 2011/0131299 | A1* | 6/2011 | Sardary | G11B 27/034 709/219 |
| 2012/0036423 | A1* | 2/2012 | Haynes, II | G06Q 30/0201 715/230 |
| 2012/0166453 | A1* | 6/2012 | Broder | G06Q 10/10 707/752 |
| 2012/0192118 | A1* | 7/2012 | Migos | G06F 1/1626 715/863 |
| 2012/0317239 | A1* | 12/2012 | Mulder | G06Q 10/101 709/219 |
| 2013/0044050 | A1* | 2/2013 | Ylivainio | G06F 3/0481 345/156 |
| 2013/0097481 | A1* | 4/2013 | Kotler | G06F 17/241 715/230 |
| 2013/0132455 | A1* | 5/2013 | Mangini | G06Q 10/10 709/201 |
| 2013/0212059 | A1* | 8/2013 | Ameri-Yahia | G06F 16/358 706/52 |
| 2014/0006461 | A1* | 1/2014 | Estes | G06F 17/2211 707/821 |
| 2015/0052482 | A1* | 2/2015 | Hontz, Jr. | G06F 3/0483 715/817 |
| 2015/0178259 | A1* | 6/2015 | Davis | G06F 17/241 715/230 |
| 2015/0254214 | A1* | 9/2015 | Rosenberg | G09B 5/06 715/202 |
| 2015/0286624 | A1* | 10/2015 | Simons | G06F 17/2247 715/230 |
| 2016/0057092 | A1* | 2/2016 | Liao | G06F 16/951 709/206 |
| 2017/0032028 | A1* | 2/2017 | Joi | G06F 16/338 |
| 2017/0286416 | A1* | 10/2017 | Gan | G06F 3/0482 |
| 2019/0057069 | A1* | 2/2019 | Chegini | G06Q 10/06 |
| 2019/0325071 | A1* | 10/2019 | Rose | G06F 3/0485 |

OTHER PUBLICATIONS

"Microsoft Excel Online—Work together on Excel Spreadsheets", Retrieved From: https://office.live.com/start/Excel.aspx, Retrieved Date: Jun. 4, 2018, 3 Pages.

"Track Changes and View, Add, or Edit Comments—Office Support", Retrieved From: https://support.office.com/en-us/article/track-changes-and-view-add-or-edit-comments-56343a35-b64c-4aeb-ac5b-d1bdb979490a, Retrieved Date: Jun. 4, 2018, 3 Pages.

"View, Reply, Print Comments in Adobe Acrobat", Retrieved From: https://helpx.adobe.com/acrobat/using/comments.html, Nov. 15, 2017, 11 Pages.

"Working with Comments—Smartsheet Help Articles", Retrieved From: https://web.archive.org/web/20170606181541/https:/help.smartsheet.com/articles/521892-working-with-comments, Jun. 6, 2017, 5 Pages.

"Final Office Action Issued in U.S. Appl. No. 15/088,065", dated Sep. 27, 2017, 12 Pages.

"U.S. Appl. No. 15/993,459", filed May 30, 2018, 30 Pages.

Lanfranchi, et al., "Semantic Web-Based Document: Editing and Browsing in AktiveDoc", In Proceedings of Second European Semantic Web Conference on the Semantic Web: Research and Applications, May 29, 2005, 11 Pages.

"International Search Report and Written Opinion Issued in PCT Application No. PCT/US2017/024386", dated Jul. 14, 2017, 13 Pages.

"Non-Final Office Action Issued in U.S. Appl. No. 15/088,065", dated May 17, 2017, 11 Pages.

Wyatt, "Jumping to a Comment", Retrieved From: http://word.tips.net/T001808_Jumping_To_a_Comment.html, Jun. 6, 2011, 2 Pages.

* cited by examiner

FIG. 7

COMMENT NOTIFICATIONS FOR ELECTRONIC CONTENT

BACKGROUND

Collaborative authoring and review process is often used in the development and review of different types of documents. For example, many documents generated in today's electronic society are created by one or more individuals, and then further subject to review by several others. The documents to be reviewed are created as a form of electronic content that is forwarded to others for review and revision, perhaps via an electronic network.

Electronic documents typically contain digital content such as text, images, slides, and spreadsheets. During the creation of a document, content can be subject to revisions over a period of time, often by multiple people. Some document-editing applications—such as word processors, spreadsheet programs, and presentation applications—can allow users to add comments, suggestions, and/or add and delete content.

Authors and reviewers participating in this shared process typically insert markups, comments, and other annotations directly into the file containing the document. In such cases, the document creator or manager can go through the individual pages or sheets comprising the electronic document in order to review the comments. Furthermore, particularly in the cases of documents that include discrete units of content, the ability to readily ascertain or track the number of comments in a document, or whether any comments for subsequent pages are present, can be challenging and at times unclear. Thus, there remain significant areas for new and improved ideas for the efficient development of documents, as well as the management of comments associated with content in an electronic document.

SUMMARY

A data processing device, in accord with a first aspect of this disclosure, includes at least one processor and one or more computer readable media. The computer readable media include instructions which, when executed by the at least one processor, cause the at least one processor to present, on a display, a graphical user interface that includes a first region and a second region. The first region is configured to display at least a first portion of a first discrete segment of a plurality of discrete segments for an electronic content. The second region is configured to display a list comprising of one or more comment items. The instructions also cause the at least one processor to identify an availability of a first comment associated with a second portion of a second discrete segment in the plurality of discrete segments, the second discrete segment being hidden from view while the first discrete segment is being displayed, and add, in response to identifying the availability of the first comment, a first actuatable comment indicator to the list of comment items, the first actuatable comment indicator being configured to enable a user to navigate to the second portion. In addition, the instructions also cause the at least one processor to display the first actuatable comment indicator in the second region, wherein the first actuatable comment indicator is initially in a low visibility mode, and transition, in response to a first user input event associated with the first actuatable comment indicator, an appearance of the first actuatable comment indicator from low visibility mode to a high visibility mode during the first user input event.

A data processing device, in accord with a second aspect of this disclosure, includes at least one processor and one or more computer readable media. The computer readable media include instructions which, when executed by the at least one processor, cause the at least one processor to present, on a display, a graphical user interface that includes a first region and a second region. The first region is configured to display at least a first portion of a first discrete segment of a plurality of discrete segments for an electronic content. The second region is configured to display a list comprising of one or more edit items. The instructions also cause the at least one processor to identify an availability of a first edit associated with a second portion of a second discrete segment in the plurality of discrete segments, the second discrete segment being hidden from view while the first discrete segment is being displayed, and add, in response to identifying the availability of the first edit, a first edit indicator to the list of edit items. In addition, the instructions also cause the at least one processor to display the first edit indicator in the second region, where the first edit indicator is configured initially to conceal any text from appearing in an interior region of the first edit indicator.

A method, in accord with a third aspect of this disclosure, includes presenting, on a display of a user device, a graphical user interface including a first region and a second region. The first region is configured to display at least a first portion of a first discrete segment of a plurality of discrete segments for an electronic content, the sequence of electronic content including a plurality of discrete segments. The second region is configured to display a list comprising of one or more comment items. The method also includes identifying an availability of a first comment associated with a second portion of a second discrete segment of the plurality of discrete segments, the second discrete segment being hidden from view while the first discrete segment is being displayed, and adding, in response to identifying the availability of the first comment, a first actuatable comment indicator to the list of comment items, the first actuatable comment indicator being configured to enable a user to navigate to the second portion. In addition, the method includes displaying the first actuatable comment indicator in the second region, where the first actuatable comment indicator is initially in a low visibility mode, and transitioning, in response to a first user input event associated with the first actuatable comment indicator, an appearance of the first actuatable comment indicator from low visibility mode to a high visibility mode during the first user input event.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

The drawing figures depict one or more implementations in accord with the present teachings, by way of example only, not by way of limitation. In the figures, like reference numerals refer to the same or similar elements. Furthermore, it should be understood that the drawings are not necessarily to scale.

FIG. 7 is a display diagram illustrating an implementation of the spreadsheet application with the comment interface including a third comment indicator;

DETAILED DESCRIPTION

Figure 1:
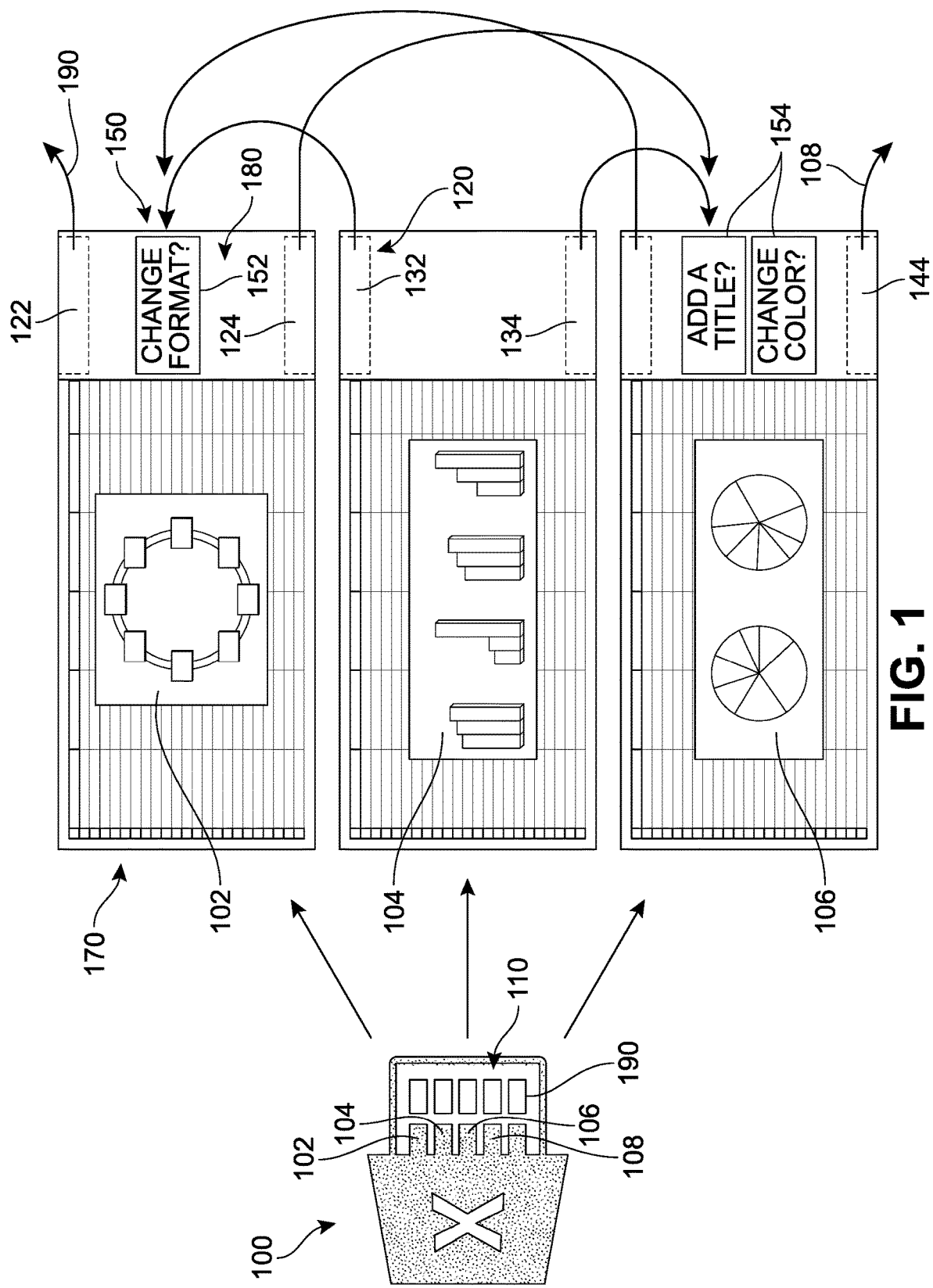
FIG. 1 illustrates an implementation of a document editing and review environment.

In the following detailed description, numerous specific details are set forth by way of examples in order to provide a thorough understanding of the relevant teachings. However, it should be apparent that the present teachings may be practiced without such details. In other instances, well known methods, procedures, components, and/or circuitry have been described at a relatively high-level, without detail, in order to avoid unnecessarily obscuring aspects of the present teachings.

The following implementations introduce a comment management system and process for facilitating navigation of comments that are linked to different segments of electronic content. The presentation of comment indicators that notify a user as to the existence, presence, or availability of a comment in a previous and/or subsequent segment can allow users to remain cognizant of the overall comment context for the larger collection of electronic content. Furthermore, this system can offer users a broader awareness of the existence or availability of any comments in the electronic content as a whole, even while viewing a segment that does not include comments. These tools can provide collaborative document users the ability to more clearly distinguish comments for a currently viewed content portion from indicators for comments on previous or subsequent segments of content. In addition, the comment indicators are configured to transition between a low visibility mode and a high visibility mode in response to user inputs, which ensures that users are not distracted by comment information inapplicable to their currently viewed segment of electronic content.

As introduced above, applications such as word processors, publishers, spreadsheets, presentation software, and others can be used to generate electronic documents or content. For purposes of this description, the term "electronic content" or "document" includes any digital data that may be presented (e.g., visually or audibly presented), including but not limited to an electronic document, a media stream, a web page, a hypertext document, an image, digital video or a video recording, digital audio or an audio recording, animation, a markup language document, such as a HyperText Markup Language (HTML) or eXtensible Markup Language (XML) document, a form having blank components to accept entered data, or data describing the application of a GUI, and other digital data. As an example, this electronic content may include spreadsheets, presentations, or other digital-based media.

Furthermore, within some types of documents, the electronic content can be understood to include or be segmented into one or more units that will be referred to as "discrete segments". For purposes of this application, the term "discrete" describes portions of content that are distinct, separate, and/or apart from other portions. Thus, one collection of electronic content (such as a document) can be characterized as or by discontinuous parts/units or segments. For example, a user may need to "tab" through various sheets (segments) in a spreadsheet, and a user may need to move fully past one slide to view another slide in a presentation. Thus, discrete segments can include individual slides in a PowerPoint® or other presentation application document, as well as individual spreadsheets in a database such as Excel®, individual photos in a digital photo album, or other portions of electronic content that are not intended or configured as a default to be presented or merged into a single display unit. A display unit may be understood to refer to an individual portion of electronic content that is configured for display on the screen at one time. This is in contrast to electronic content that viewable as a substantially continuous or flowing stream or can be readily merged to form a continuously 'scrollable' document (for example, word processor documents).

In addition, the electronic content and/or any corresponding discrete segments can include elements that will be referred to as content portions. A "content portion" for purposes of this description includes any part of electronic content that is defined or discernable as a part. For example, a content portion may be automatically discerned from a characteristic of the content portion itself (e.g., a letter, number, word, sentence, paragraph, section, image, symbol, or chapter of an electronic document, or other file format designation) or may be manually defined by a reviewer or end-user (e.g., selected collection of words in an electronic document, a selected portion of a digital image, a selected group of cells in a spreadsheet, a selected region in a slide from a presentation). Examples of content portions include portions or pieces of electronic text or other material within an electronic document, comments, dynamic content in the form of portions of media streams, such as sections of digital video or frames or sets of frames of digital video or digital audio, dynamic content in the form of segments or frames of animations, electronic forms, form templates, form elements, form data, actuatable element specifications or executable instructions, and various elements presentable or accessible by reviewers within electronic content, including instances of scripted and non-scripted dynamic content and the like.

Furthermore, an end-user (or "user") for purposes of this application is one who creates, authors, views, develops, manages, reviews, revises, or deletes pieces of electronic content, including the creation, viewing, or updating of comments associated with the electronic content. An end-user includes a user of application programs, as well as the apparatus and systems described herein. Furthermore, for purpose of this description, the term "software application", "software", or "application" refers to a computer program that performs useful work, generally unrelated to the computer itself. Some non-limiting examples of software applications include word processors, spreadsheets, slideshows, presentation design applications, accounting systems, and telecommunication programs, as well as gaming software, utility and productivity tools, mobile applications, presentation graphics, and other productivity software.

In different implementations, software applications such as programs offered in the Microsoft Office Suite® (e.g., Word®, Powerpoint®, Excel®, Visio®) and other applications can offer a variety of commenting and annotating tools. For example, Microsoft Excel® offers users tools such as Comments, Highlight, Underline and other formatting options, Track Changes, Compare, among others, to add comments or make changes to a document. In other applications, such as Google Sheets® and Google Slides®, a "Comments" option may be used to suggest modifications or provide feedback for a document, or view comments. These are non-limiting examples, and any other electronic content editing or collaboration application may benefit from the disclosed implementations.

Once a comment is added, the document as viewed by other reviewers may present the information included in the comments. This feature can be used to facilitate collaborative workflows. For purposes of this description, data or documents being developed collaboratively include any activity in which multiple machines and/or users operate together autonomously, or as directed by humans, to process information, including electronic content. Processing the information may include the activities of acquiring the information, augmenting the information (e.g., via the addition of meta-data or comments), sorting the information, changing the information, deleting the information, rendering the information, aggregating the information from multiple sources, transforming the information from one form to another, and deriving new information from previously-existing information. One example of a collaborative process is the cooperation of multiple reviewers to view, comment on, and make changes to a document as part of a shared review activity.

During the viewing of comments associated with a document, end-users can be slowed or perplexed in cases where there are large numbers of comments, particularly if the comments are distributed across multiple discrete segments of electronic content. For example, a user may not be aware of comments that extend beyond the content being currently viewed, and navigation through the various comments can be unwieldy. In some cases, the 'big picture' progress or workflow of a document or file may be obscured as users attempt to communicate via comments across multiple pages or sheets of a document. As will be described below, the proposed system provides both individual and group users the ability to more precisely communicate and review comments across many discrete segments of electronic content, providing users with a more comprehensive and intuitive sense of the review process. This in turn can improve the management of electronic documents and facilitate a more natural and effective workflow. The following systems and methods can thereby facilitate a user's navigation of the comments in a document as well as their awareness of subsequent ("next") and previous comments that may be present throughout the sequence of discrete segments in the document. Users may more readily ascertain whether there are comments for discrete segments of a document that are not currently being displayed, significantly improving the user's productivity.

Figure 2:
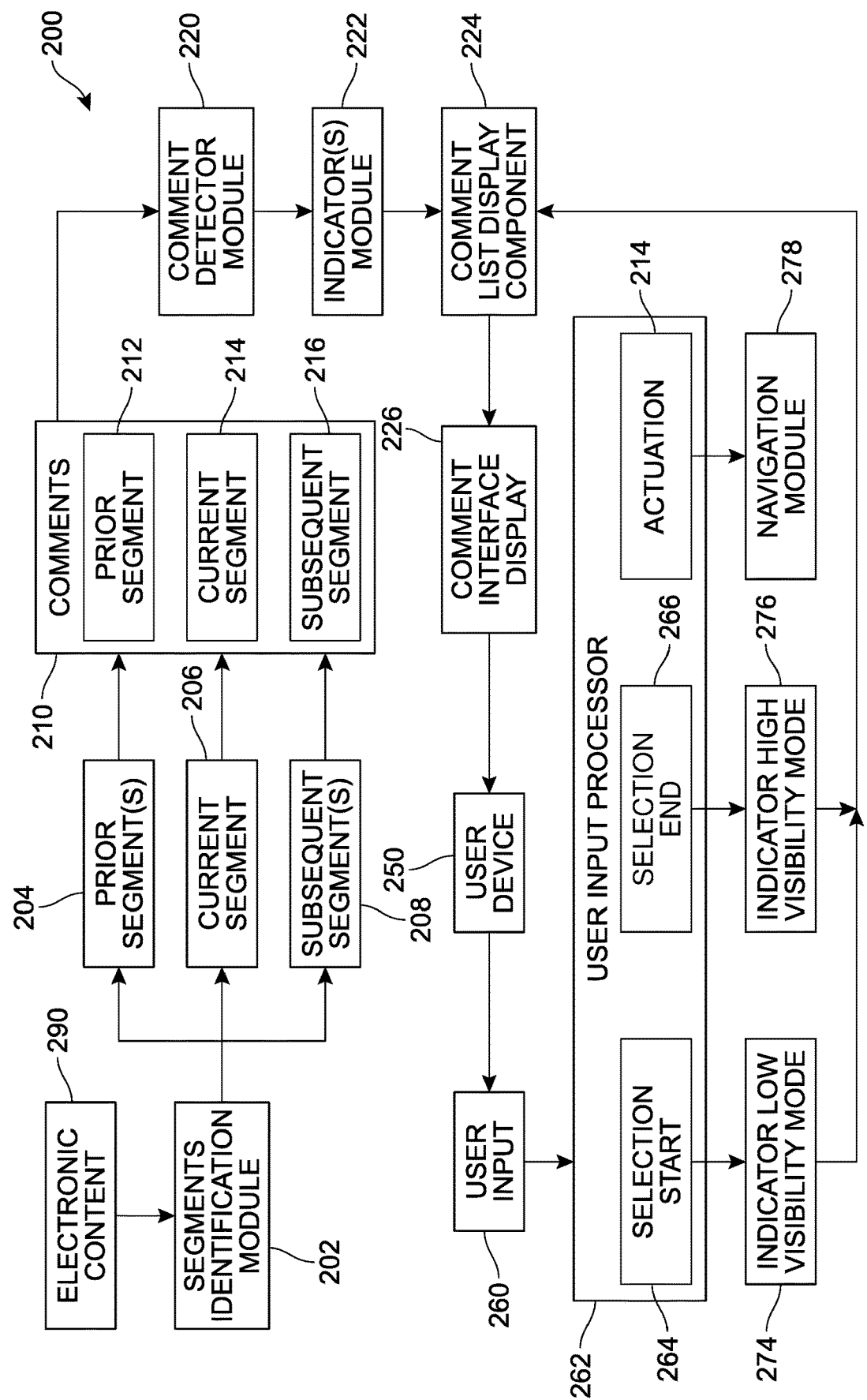
FIG. 2 is a conceptual diagram illustrating one implementation of a distributed computing environment for presenting comment indicators.

In order to better introduce the systems and methods to the reader, FIG. 1 presents an example of a representative review and/or commenting environment for implementing a comment notification system (the system is illustrated schematically in greater detail in FIG. 2). In different implementations, the environment can include a plurality of computing device end-users, or simply "users" who can author, edit, and/or review the document (for example a first user, a second user, a third user, etc.). One or more users can interact with or manipulate data presented via a user device. As users collaborate on a document, various pieces or segments of the document may be modified or otherwise associated with a note or comment. In one implementation, multiple users can access the same document at the same time and make changes that are presented in real-time to other users. In such cases, workflow occurs via multiple 'streams' that are configured to push data and pull data from a central repository or cloud network.

In this example, a first electronic content item ("first item") 100 is illustrated. The first item 100 can include any type of digital media file, as described above. In this example, first item 100 is an electronic database that includes a plurality of spreadsheets ("sheets") 110. Each sheet is represented here as a small rectangular shape. While only a first sheet (or initial sheet) 102, a second sheet 104, a third sheet 106, a fourth sheet 108, and a last sheet 110 are identified for purposes of this example, it should be understood that the document can include any number of sheets.

For purposes of this description, an "interface" refers to a mechanism for communicating content through a client application to an application user. For example, interfaces may include pop-up windows that may be presented to a user via native application user interfaces (UIs), controls, actuatable interfaces, interactive buttons or other objects that may be shown to a user through native application UIs, as well as mechanisms that are native to a particular application for presenting associated content with those native controls. Furthermore, an "actuation" or "actuation event" refers to an event (or specific sequence of events) associated with a particular input or use of an application via an interface, which can trigger a change in the display of the application.

Some of the individual sheets are presented in a magnified view in FIG. 1, including the first sheet 102, the second sheet 104, and the third sheet 106. Each sheet will be displayed in the database application via a first region of a graphical user interface, herein referred to as an electronic content viewport interface, or electronic content viewing interface ("content interface") 170. In some implementations, the content interface 170 can be positioned or located adjacent or proximate to a second region, herein referred to as a comment interface 180. The content interface 170 can be configured to display or present various portions of the electronic document. In addition, the comment interface 180 is configured to display or present a comment listing (which includes any comments 150 that are associated with the currently viewed segment of content) as well as comment indictors 120 for comments associated with the previous and/or subsequent sheets. The comments 150 can be added, for example, by one or more users of the document with permission to review or edit the document.

In some implementations, the system can be configured to provide guidance to a user that can signal whether the document includes additional or other comments for currently hidden or not-viewed content. Referring to the first sheet 102, a first comment indicator ("first indicator") 122 is displayed near an upper boundary (or first end) of the comment interface 180, a second comment indicator ("second indicator") 124 is displayed near a lower boundary (or second end) of the comment interface 180. A first comment 152 is also displayed in the comment interface 180. In some implementations, the system can be configured to minimize the visible presence of the comment indicators. This can provide a user with greater clarity or certainty regarding the context of the comment indicators and allow the user to better focus on the comments for the currently viewed page, rather than distract the user by the presence of these comment indicators. For example, in some implementations, the comment indicators can be substantially transparent, translucent, dimmed, reduced in size, obstructed, or otherwise less noticeable or more subtle relative to comments 150; this type of low visibility mode for the comment indicators will be discussed further below.

In addition, the comment interface of the second sheet 104 includes or displays a third comment indicator ("third indicator) 132 and a fourth comment indicator ("fourth indicator") 134, and does not include any comments for the currently viewed sheet. The comment interface of the third sheet 106 includes or displays a fifth comment indicator ("fifth indicator") 142, a sixth comment indicator ("sixth indictor") 144, as well as second and third comments 154.

While viewing the first sheet 102, a user can readily observe or notice that the first sheet 102 includes a comment (first comment 152), related or corresponding to a content portion in the first sheet 102. However, a user can also take note of the first indicator 122, which can signal the presence or availability of a comment associated with another page or sheet. In this case, because the first sheet 102 is the first sheet in the sequence, the first indicator 122 is actually identifying the presence of a final or last comment 190 toward the end of the sequence. The second indicator 124 can signal the presence of the next available comment on a future or subsequent sheet—in this case, on third sheet 106.

Similarly, while viewing the next sheet (second sheet 104), a user can readily observe or notice that the content of second sheet 104 is not associated with any comments. However, a user can also take note of the third indicator 132, which can signal the existence or availability of a comment associated with another page or sheet. In this case, because the second sheet 104 is between two other sheets that both include comments, the third indicator 132 is identifying the presence of the first comment 152 on the first sheet 102. The fourth indicator 134 can signal the presence of the next available comment on a future or subsequent sheet—in this case, on third sheet 106. Thus, as noted earlier, the indicators can not only serve to let the user know about comments in a previous/upcoming sheet, but in cases where there are no comments for a currently viewed sheet, allow the user to recognize that even though no comments are available for the currently viewed sheet, the document as a whole does in fact have comments associated with other pages.

While viewing the next sheet (third sheet 106), a user can similarly readily observe or notice that the content of third sheet 106 includes comments (second and third comments 154), related or corresponding to content portion(s) in the third sheet 106. In addition, a user can also take note of the fifth indicator 142, which can signal the presence or availability of a comment associated with another page or sheet. In this case, because the third sheet 106 is 'after' or subsequent to a sheet that does not include comments (second sheet 104), the fifth indicator 142 is actually identifying the presence of the first comment 152 on the first sheet 102. The sixth indicator 144 can signal the presence of the next available comment on a future or subsequent sheet—in this case, on a fourth sheet 108 (not shown here). If the third sheet had been the last sheet in the sequence, the sixth indicator 144 could instead have signaled the presence of the first comment 152 on the first sheet 102, creating an impression of a "cycle" of comments.

By providing subtle signals in the form of indicators, the comment interface can be used to augment a user's understanding of the document revisions or notes as a whole without disrupting work on the currently viewed segment. Additional details regarding this system will now be provided with reference to FIG. 2.

Referring now to FIG. 2, an example of a representative architecture of a comment notification management system ("system") 200 is depicted. In different implementations, the system 200 can be configured to present user interfaces for display of electronic content and associated comment-related messages. The system 200 can be further configured to update the content and comments shown based on the discrete segment being viewed. It is to be understood that the system 200 presented here is merely an example implementation and that a wide variety of other implementations are possible.

In different implementations, the system 200 can include or be in communication with one or more end-user systems ("user device") 250. The user device 250 can include a display device used in connection with an application to display graphical elements generated by a user interface to an end-user. Furthermore, the user device 250 also includes one or more input devices used to receive commands or other input from the user (user input 260). While only one user device 250 is shown in FIG. 2, other implementations can include any number of user devices.

A comment interface display module 226 can be configured to generate various graphical user interfaces in the application for viewing and editing portions of electronic content 290. For example, the comment interface display module 226 may be configured to generate the various user interfaces that will be described below in connection with FIGS. 3-11, including but not limited to the content interface, the comment interface, comments, comment indicators, and other output or presentation interfaces.

In different implementations, when electronic content 290 is provided or made available to the system, a segments identification module 202 can be configured to process the electronic content and determine whether the electronic content includes discrete segments of content, and if so further identify the sequence and type of discrete segments. In addition, the segments identification module 202 can determine which segment is being currently viewed or is displayed in the content interface ("current segment") 206, as well as whether there are prior discrete segments 204 that occur before the current segment 206, and/or subsequent segments 208 that occur after the current segment 206 in the sequence.

A comments module 210 receives the information identifying the segments, and can determine whether any prior segments are associated with comments (prior segment 212), whether the current segment is associated with comments (current segment 214), and/or whether any subsequent segments 216 are associated with comments. This information can be provided to or received by a comment detector module 220, which can notify an indicator module 222 of the availability of comments in currently hidden discrete segments (before or after the current segment). The indicator module 222 can be configured to generate the comment indicator. In addition, both the comment indicator and any comments that have been detected can be submitted to a comment list display component 224 to create the appropriate comment list for display in the comment interface (see comment interface display 226).

In different implementations, the user may submit various types of input, such as a mouse hover or a click, that are associated with a comment indicator. Such input can be received by a user input processor 262, which—based on the type of input that is detected—can generate an appropriate response. In this example, a hover or mouseover event or other such user input associated with the comment indicator, is referred to as a selection start input event 264, and the termination or absence of any hover or input associated with the comment indicator is referred to as a selection end event 266. In addition, an active selection (such as a click or other command-type selection) of the comment indicator is referred to as an actuation event 268. When there is no user input that is associated with the comment indicator, the indicator can remain in low visibility mode 276, which can include a significant diminishment of the appearance of the comment indicator. In cases where there is first user input associated with the comment indicator such as a mousehover, the system can trigger transition to an indicator high visibility mode 274, which can include a brightening or increase in size of the comment indicator. If that user input is removed or terminated, the indicator can return to a low visibility mode 276 (see FIGS. 3-11). Furthermore, if an actuation is detected, the system can navigate to a different discrete segment (navigation module 278).

Figure 3:
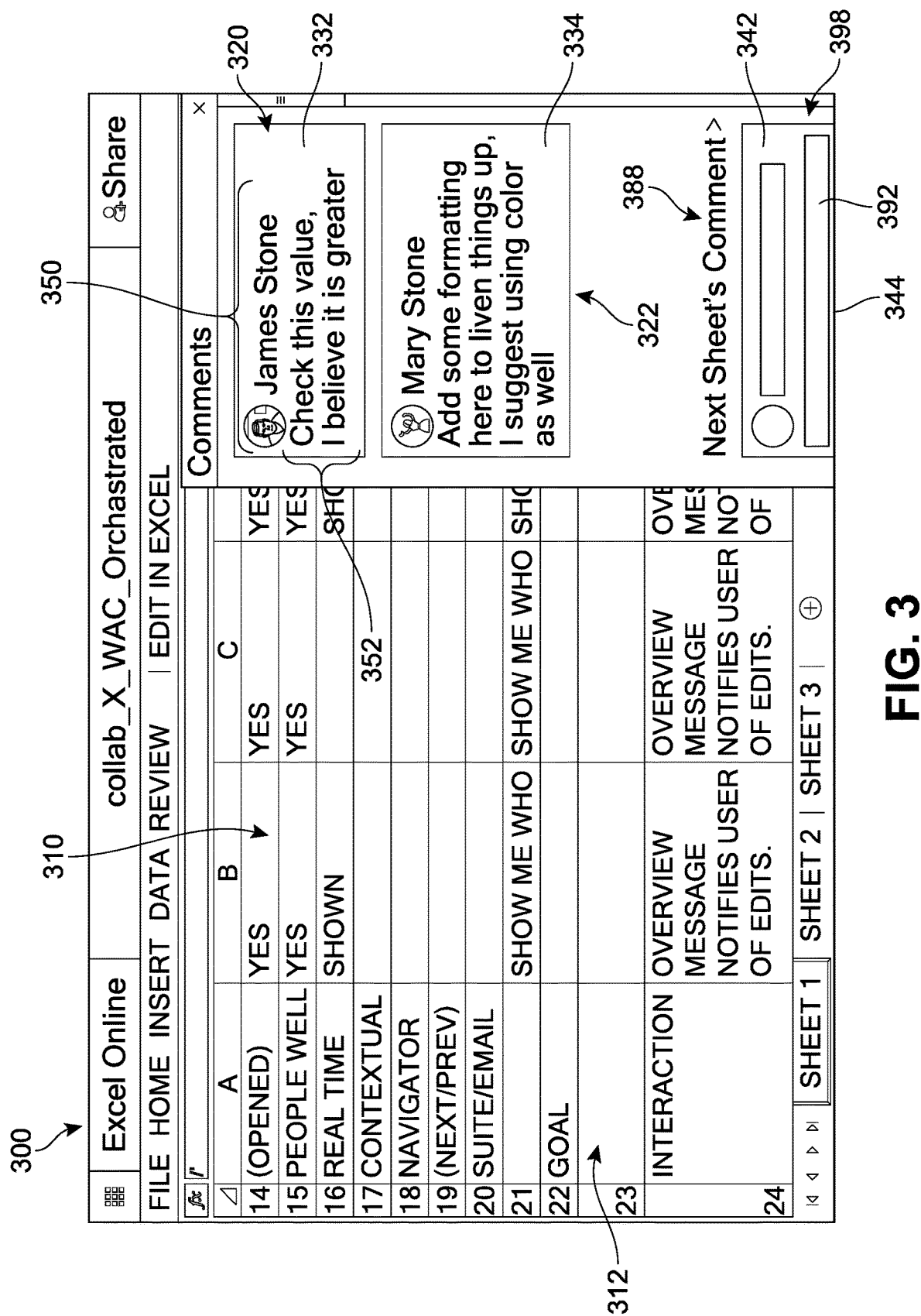
FIG. 3 is a display diagram illustrating an implementation of a spreadsheet application with a content interface presenting a first sheet, and a comment interface including a first comment indicator in a low visibility mode.

For purposes of clarity, one implementation of a comment indicator process will be presented now with reference to FIGS. 3-7. In FIG. 3, a database application 300 is depicted with a graphical user interface, where the graphical user interface includes a first region and a second region. Throughout this description, the first region may be referred to as a content interface 310, and may be configured primarily to display portions of the selected electronic content. In addition, the second region may be referred to as a comment interface 320 throughout the description, and may be configured primarily to display information associated with comments for the content presented in the first region. As noted above, collaboratively edited electronic documents frequently include comments distributed throughout the electronic document. As users view the document, they usually view both the content of the electronic document and any associated comments. The comments are typically presented in a context that allows a user to determine which portion of the content is linked to a particular comment. In this example, the content interface 310 displays a first sheet 312, and the comment interface 320 displays a first comment list 322. The first comment list 322 includes a first comment 332 and a second comment 334 associated with the content of the first sheet 312, as well as a first indicator 342.

In different implementations, one or more of the comments for a currently viewed sheet can include provisions for informing users of an identity 350 of the comment author (e.g., a name, or an image such as a photograph of the person), and/or the content of the comment ("comment content") 352. This allows a user to quickly review the comment while viewing the corresponding content portion. Comments can also include an appearance that is substantially solid, clear, and obvious in order to be easily recognizable to the user. In this case, each comment is bounded or defined by a solid rectangular outline, though in other implementations, comments can be bounded, surrounded, or boxed by any shape outline, or may not include an outline. In some implementations, the comments may be highlighted or formatted in a way to clearly distinguish them from the background of the comment interface.

In contrast, comment indicators can be configured as relatively simple graphical representations. The comment indicators can include little to no content, and/or have a relatively subtle or unobtrusive appearance. For example, although the first indicator 342 in FIG. 3 has a substantially rectangular-shaped outline, similar to the comments above, it is disposed proximate to a lower end of the comment interface 320, and is presented such that the box appears to be partially obstructed by a lowermost edge 344 of the comment interface 320 (low visibility mode 398). While in low visibility mode 398, the overall shape comment indicator can be similar in appearance to a cropped or abbreviated version of the comment 'cards' or boxes that may be displayed in the comment interface for the currently viewed comment. In some implementations, the comment indicator can be cropped such that it corresponds to between 30%-80% of what the actual comment size associated with the previous/next sheet would approximately have. In other implementations, there may be no cropping effect, or the cropping effect may be minimal, while the indicator is 'ghosted' (see FIG. 8) or otherwise be less noticeable or apparent. Thus, the first indicator 342 is configured to be less intrusive by seeming to hide or 'peek' above the lowermost edge 344. In addition, such a reduction in size of the comment notification can improve the overall user experience of the feature on smaller displays, as the space required by the notification system is also reduced.

Furthermore, in some implementations, the outline of and/or symbols that may be included in the first indicator 342 can appear faded, translucent, include a broken line, or be lighter in tone or shade, relative to the standard appearance of comments displayed in the comment interface, again diminishing the prominence of the indicator (see additional details on a ghosted effect in FIG. 8) and increasing its low visibility attribute(s). In addition, while in some cases the identity of the upcoming comment's author may be displayed, in other implementations—as shown in FIG. 3—the identity may be masked by a blank icon, a symbol, a pictorial representation or shape, or there may be no indication at all of authorship. These characteristics of the comment indicator's appearance facilitate a user's ability to distinguish or readily ascertain that the comment indicator is directed to a section that is not located on the currently viewed sheet, and more easily attend only to a review of the current sheet, without diversion from additional information that is not relevant to their review of the current sheet.

In different implementations, the comment indicator can be further or alternatively configured to minimize disruption to a user's ability to focus or attend to the currently viewed sheet while still providing clear context about the previous and/or next comments. For example, the first indicator 342 as shown does not include content related to the content of the next comment. Rather, in some implementations, the information presented in the first indicator 342 may be limited to a symbolic representation 392 of upcoming text. In FIG. 3, a series of elongated strips, blocks, or thick lines are displayed. This can be understood to convey the idea of text and/or information without an actual presentation of any text and/or information. In one implementation, the blocky lines are similar in appearance to traditionally redacted or strike-through text. For example, a comment indicator can be configured to at least initially to conceal or hide any alphanumeric text from appearing or being displayed within an interior region of the first actuatable comment indicator, where the interior region refers to the space or area contained or bounded by or within the comment indicator.

In other implementations, the comment indicator may not include any information, may be devoid of any text, may primarily include a blurred, foggy, or otherwise substantially opaque visual effect ("ghosting") over text/information that would be in the previous or upcoming comment (thereby obscuring the text/information), may appear substantially blank or empty, or may include only iconic content or symbolic or pictorial representation(s) that are not text-based. In other implementations, the comment indicator can include substantially illegible or indiscernible content, such that what is displayed in an interior region of the comment indicator is not clear enough to be read. By concealing or removing any actual words or values in the field, the comment indicator can help users avoid situations in which the user mistakenly scans each of the comment items listed in the comment interface and assumes they all pertain to the currently viewed segment, leading to an application of the comment to the wrong sheet. Furthermore, while in some implementations the comment indicator may be associated with a general title 388 identifying the feature (in this example, "Next Sheet's Comment>") the title 388 can be optional in other implementations. In any event, the title 388 can be understood to be limited in scope to feature or tool identification, rather than information that is related to the comment content itself.

The use of symbols or visual effects suggesting redacted text, 'ghosted out' text, the concealment of any alphanumeric text, or in some cases, a blank field that reveals no text or information—within the comment indicator interior space can minimize errors by precluding a user from inadvertently engaging with the content of the comment for the previous/next sheet while viewing the currently viewed sheet. For example, this approach can help the user maintain focus on the current sheet, rather than become distracted by edits or comments that lie ahead or are not related to the currently viewed content. It is well known in neuroscience and cognitive psychology that persons with the ability to read (i.e., those who are literate) will be compelled to automatically read any text that is placed before them, whether or not the person made a conscious decision to read that text. In other words, the brain will involuntarily and spontaneously read any alphanumeric characters or words if they become available in the person's field of view. In contrast, images, shapes, and colors are not associated with this type of 'automatic' effect. Thus, by providing users with comment indicators that do not include any text about the content of the upcoming (or previous) comment, and/or limiting the comment indicators to symbolic representations or blank space, the user can remain focused on the content related to the sheet that is presently being viewed, and make a conscious choice if they wish to reveal comment content for other pages or sheets. This can greatly improve workflow efficiency and accuracy.

In different implementations, the system can include provisions for adjusting the prominence or noticeability of a comment indicator in response to a user input event. For example, as a user navigates through a document and its discrete segments, they can desire confirmation or clarification of the presence of a Next Comment or Previous Comment. As another example, the user may not have been aware of the low visibility comment indicator (first indicator 342). In some implementations, the system can provide a mechanism for bringing the indicator to the user's attention in response to a particular user input. For example such an input may include movement of the cursor in close proximity to or over the comment indicator. For purposes of this application, a mouseover event refers to an occurrence of the mouse cursor being moved over a target element. In this case, the target element is the comment indicator and, in some cases, any corresponding titles. However, in other implementations, any other types of interactions with the indicator can include the user input event, including touchscreen gestures, hand gestures, keyboard commands, virtual commands, or any other instructions.

Figure 4:
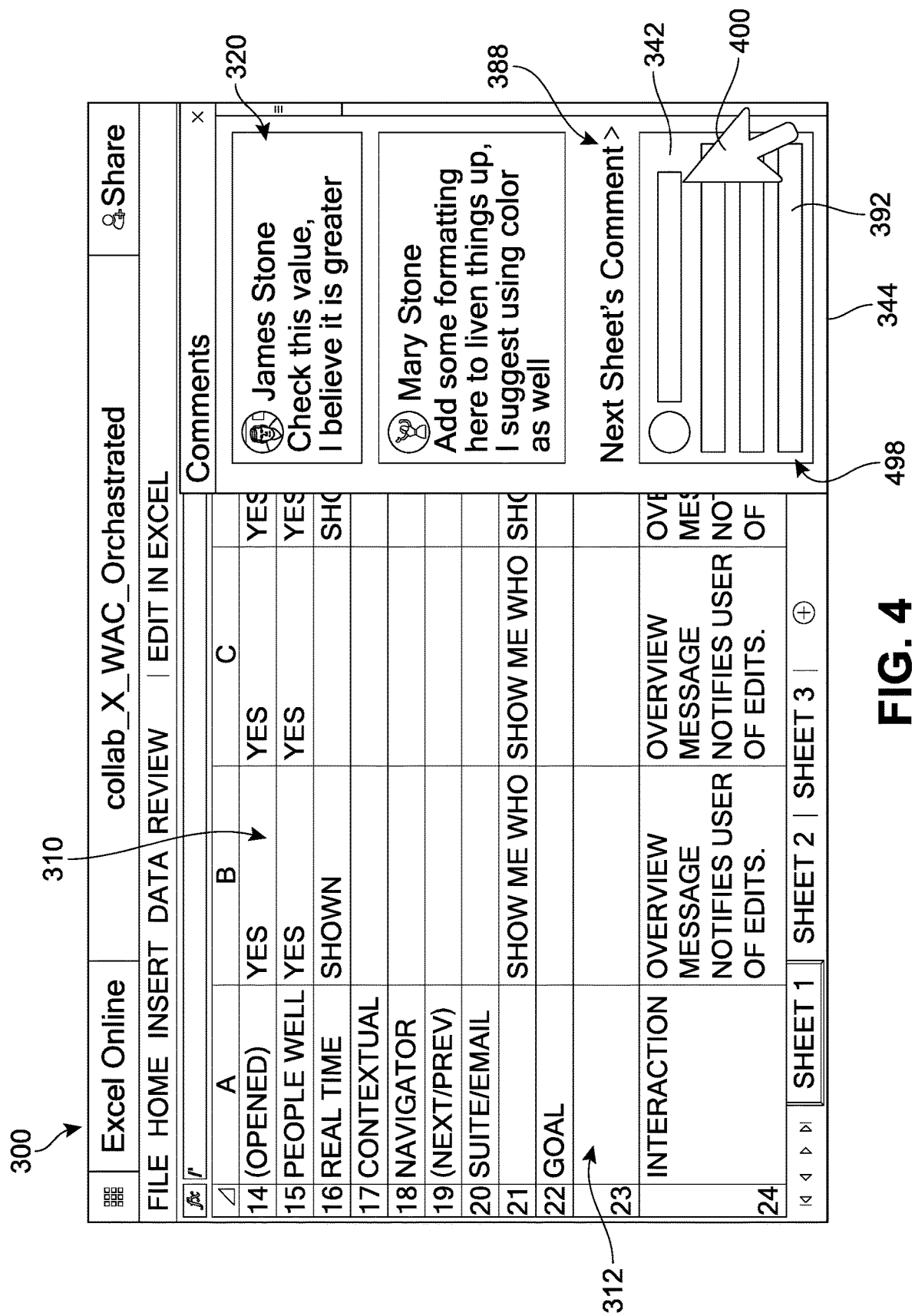
FIG. 4 is a display diagram illustrating an implementation of the spreadsheet application with the content interface and the comment interface, where the first comment indicator is in a high visibility mode.

In FIG. 4, a pointer or cursor 400 is shown hovering 'above' the graphical control element that includes the first indicator 342. In response, the first indicator can respond by a transition to a high visibility mode 498. The trigger area (the display region associated with the hover-reveal) can vary, but can at least include the comment indicator itself. In some implementations, the trigger area can also include the title 388. It should be understood that the comment indicator can be configured to return to low visibility mode when the user input is removed or ended.

As shown in the example of FIGS. 3 and 4, in response to the hover or mouseover user input event, the comment indicator can be configured to become increasingly conspicuous or manifest. In one implementation, this can occur in a substantially instantaneous manner where the comment indicator shifts rapidly from a partially-concealed and/or translucent appearance to a full-size, solid, box. In some other implementations, the comment indicator can rapidly slide upward from the lower edge (or downward from the upper edge), or otherwise 'pop-out' in appearance, such that the previous 'cropped' appearance is replaced by an uncropped, standard size comment box appearance.

In other implementations, the transition may be more gradual, such that the duration of the mouseover event (up to a maximum time) corresponds to how obtrusive the comment indicator will become. In other words, if a mouseover event occurs for only a moment (e.g., as the mouse is moved swiftly from one point on the screen to another point that includes the trigger area) the comment indicator may not transition at all, or transition only slightly, such that there is only a brief sharpening of the box or a momentary slide up/pop out, before the comment indicator reverts to its more subtle (default) low visibility appearance. Conversely, the positioning or resting of the cursor over the trigger area for a longer period can induce a gradual transition from an unobtrusive (low visibility) state to an obtrusive (high visibility) state. This can also occur in a manner similar to an ethereal or insubstantial image that grows increasingly solid, larger, and/or bright.

In some implementations, the system can include provisions to receive a command associated with the comment indicator, for example following or at the same time as the mouseover event. The command can instruct the system to navigate from the currently viewed sheet to the next available sheet with comment(s). For example, a mouse-click on the comment indicator and/or a particular command keystroke can trigger this navigation. Thus, in some implementations, the comment indicator can include an actuatable interface, where the comment indicator is capable of being actuated, thereby eliciting or triggering a response from the system. In FIG. 4, the first indicator 342 has been actuated, or is otherwise associated with an actuating event such as a mouse-click or keystroke or tap, which leads to a change in the display of both the content interface 310 and the comment interface 320.

Figure 5:
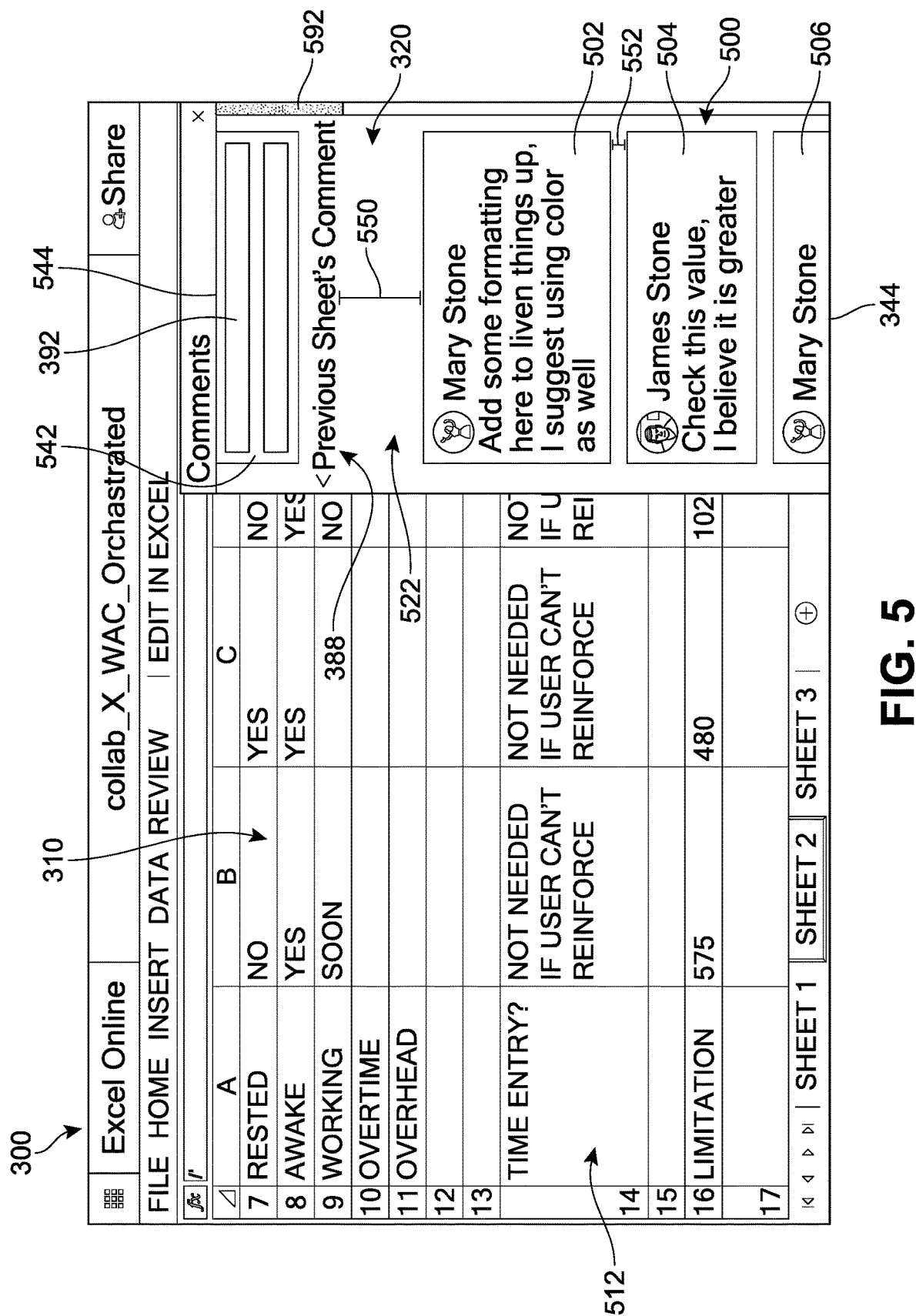
FIG. 5 is a display diagram illustrating an implementation of the spreadsheet application with the content interface presenting a second sheet and the comment interface including a second comment indicator.

As shown in FIG. 5, the content interface 310 now displays a second sheet 512 (i.e., SHEET 2 tab identified in a lower margin of spreadsheet) and the comment interface 320 now displays a second comment list 522. The second comment list 522 differs from the first comment list 322 of FIGS. 3 and 4, including comments associated with content of the currently viewed discrete segment (second sheet 512) rather than comments for the first sheet. In addition, the first indicator 342 of FIGS. 3 and 4 has been removed. Instead, the second comment list 522 includes a plurality of comments 500 that are of a length or number such that the comment interface 320 now includes a scrollable pane 592, permitting a user to navigate through all of the comments for the current discrete segment. In FIG. 5, the second comment list 522 is shown to include at least three comments, where a second comment 502 is disposed near the top of the list, followed by a third comment 504, and a fourth comment 506. The substantial entirety of the second comment 502 and third comment 504 are shown, while the fourth comment 506, extending further than the available space remaining in the comment interface 320, is cut off. However, if a user scrolls or otherwise navigates through the comments, the full content of the fourth comment 506 will be revealed (see FIG. 6), while the previous comments can 'move up' and/or may become hidden.

As noted earlier, in some implementations, the system can include provisions for informing the user as to the availability of comments on a previous sheet or page. For example, there can be a comment indicator that is associated with a comment for content that occurred earlier in the sequence, rather than later. This is illustrated in FIG. 5, where a second indicator 542 is displayed toward the top of the comment interface 320, adjacent or proximate to an uppermost edge 544 of the comment interface 320, or toward a first end of the comment list. The characteristics of the second indicator 542 can include all aspects, details, and features described above with respect to implementations of the first indicator 342.

In addition, while in some implementations the spacing between the comment indicator and the adjacent comment can be similar to the spacing between two comments, in other implementations, the system can also include provisions for more clearly distinguishing the comment indicator(s) from the comments themselves. For example, in FIG. 5, the second indicator 542 is set apart from the second comment 502 by a first distance 550. In other words, there is relatively more space extending between the indicator and the comment than there is between two neighboring comments (see for example, a relatively smaller intercomment distance 552). In some implementations, the first distance 550 can be of sufficient size that the transition from a cropped appearance (low visibility mode) to an uncropped or full size appearance (high visibility mode), for example in response to a mouseover event, can occur (a) without obstruction of the nearest comment by the full-sized (high visibility) indicator, and/or (b) without requiring any comments to be pushed down or up to accommodate the display of the larger-sized comment indicator. The additional or larger spacing also helps a user more readily differentiate the indicators from the comments, and improves the flow of the user experience itself.

As described briefly with respect to FIG. 1, in some implementations, a comment indicator that is provided toward the top of the comment interface can be configured—upon actuation—to navigate not to a previous sheet in the sequence but instead to the last sheet in the sequence that is associated with a comment. This can occur, for example, in cases where the sheet that is currently being viewed is the first or initial sheet in the sequence, and so any 'previous' comment would be looped back toward the end of the sequence. In some implementations, any title presented with such a comment indicator may also be modified to instead denote the return to the opposite end of the electronic content sequence, rather than to a 'previous' sheet, (e.g., 'Jump to Last Comment'). Conversely, a comment indicator that is provided toward the bottom of the comment interface can be configured—upon actuation—to navigate not to a subsequent sheet in the sequence but instead to the first sheet in the sequence that is associated with a comment. This can occur, for example, in cases where the sheet that is currently being viewed is the last or final sheet in the sequence and/or there are subsequent sheets but they do not have any comments, and so any 'next' comment would be looped back toward the beginning of the sequence. In some implementations, any title presented with such a comment indicator may also be modified to instead denote the return to the opposite end of the electronic content sequence, rather than to a 'next' sheet (e.g., 'Return to First Comment').

Figure 6:
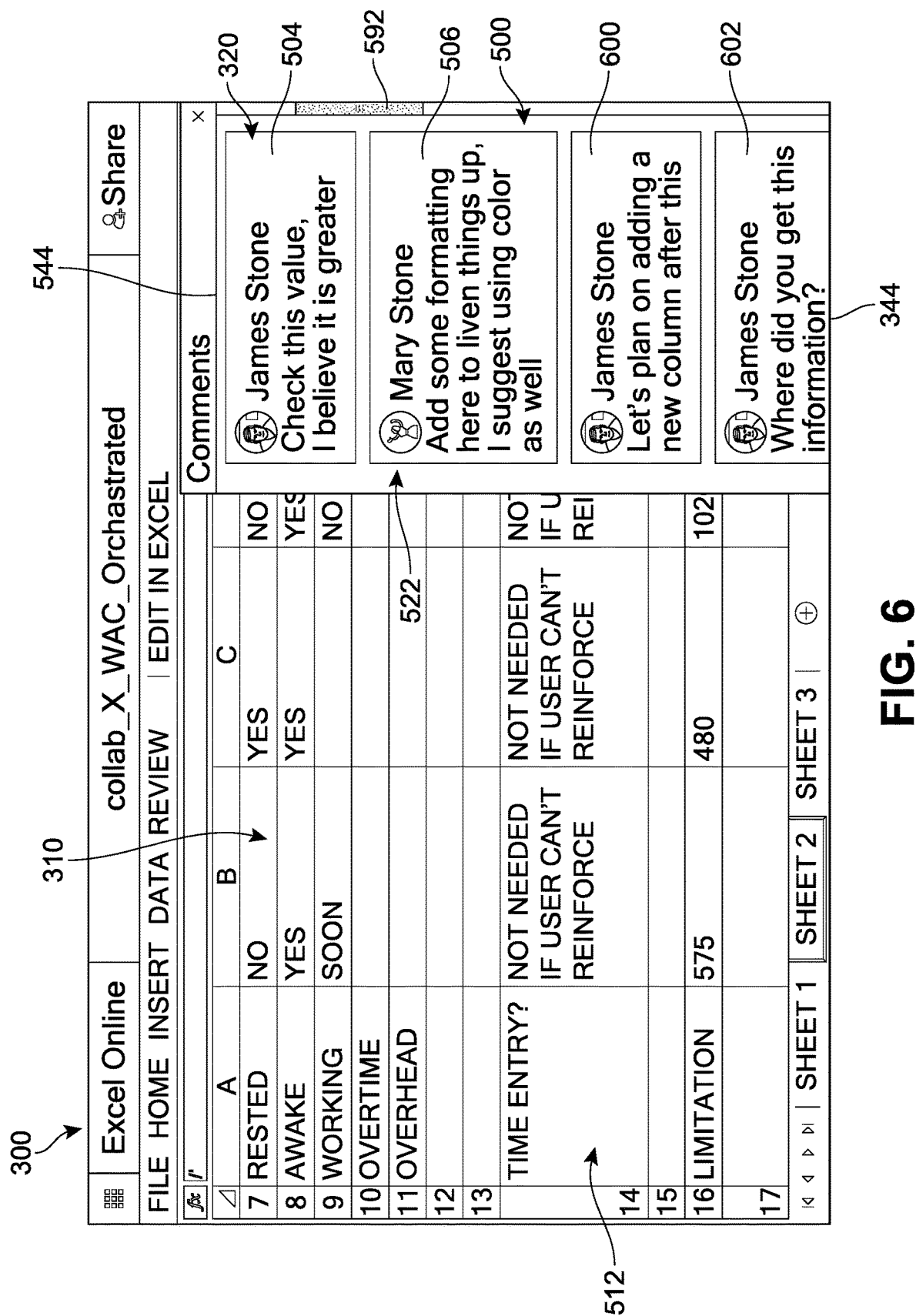
FIG. 6 is a display diagram illustrating an implementation of the spreadsheet application with the comment interface including a plurality of comments.

Referring to FIG. 6, as a user scrolls through the second comment list 522, the comment interface 320 can, in one implementation, hide or conceal the second indicator 542 of FIG. 5. It should be understood that scrolling back up toward the top of the comment list would also reinstate the display of the second indicator 542. In FIG. 6, the comments are of a length or number such that no comment indicators are now shown. In other words, in some implementations, the comment indicators are configured for display only when the start of the comments of a comment list is being presented, and/or when the end of the comments of a comment list is being presented (or when there are no available comments). Thus, the currently viewable information of the second comment list 522 of FIG. 6 differs from the currently viewable information of the second comment list 522 of FIG. 5.

Figure 7:
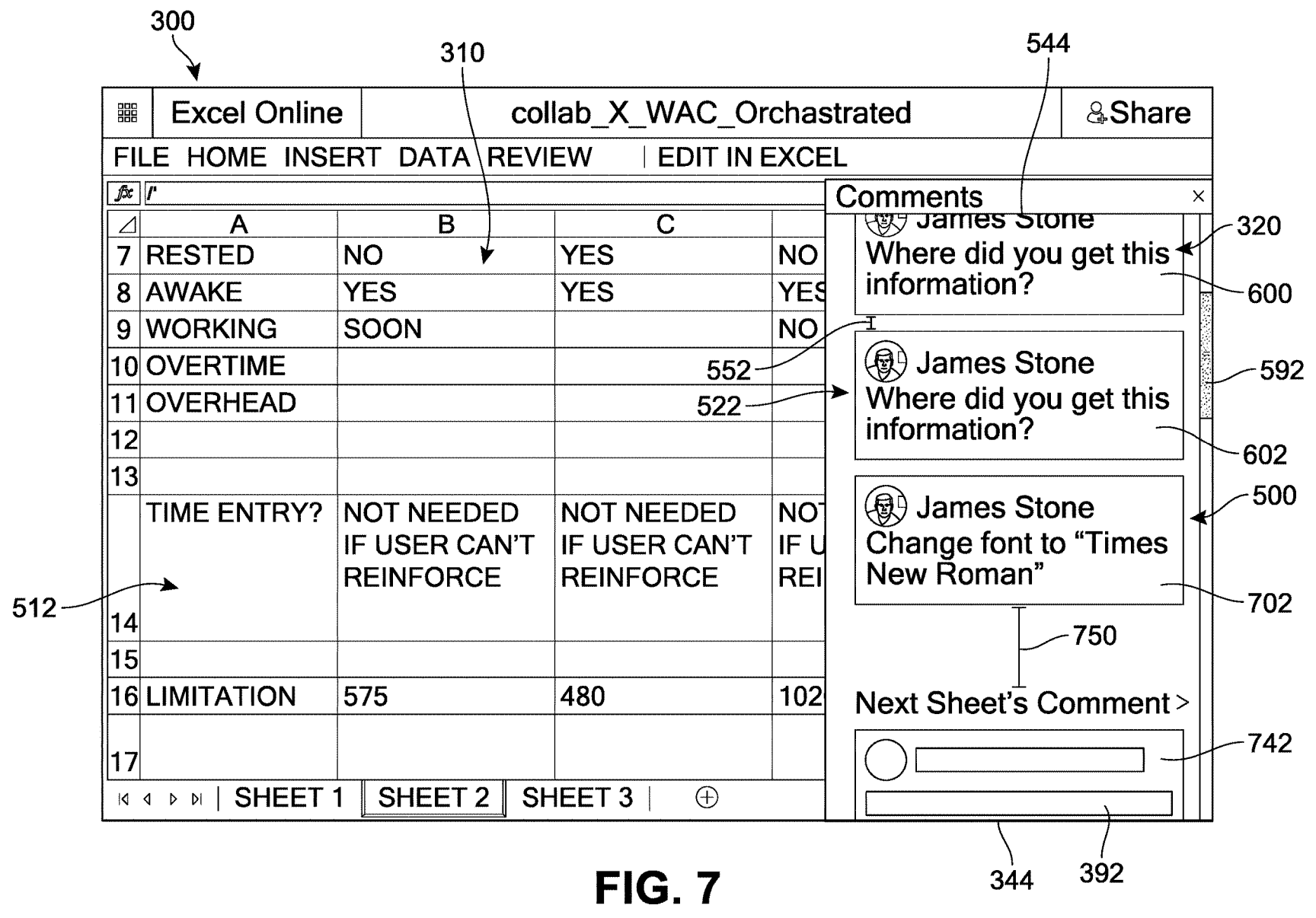

In FIG. 6, the comment interface 320 now displays the third comment 504 near the top of the interface, followed by the fourth comment 506, a fifth comment 600, and a partial view of a sixth comment 602. Thus, while the substantial entirety of the third comment 504, fourth comment 506, and fifth comment 600 is shown, the sixth comment 602 is illustrated as extending further than the available space remaining in the comment interface 320. However, if a user scrolls or otherwise navigates further through the comments, the full content of the sixth comment 602 will be revealed, while the previous comments can 'move up' and/or become hidden. This is depicted in FIG. 7, where the second comment list 522 has been fully 'scrolled' through, and the comment interface 320 now displays the fifth comment 600 and the sixth comment 602, as well as a seventh (last) comment 702 for this sheet.

Following or below the seventh comment 702, a third indicator 742 is now visible, in low visibility mode. As noted above, the indicator can transition from low visibility mode to high visibility mode in response to a user input event. It should be understood that in some implementations, the transition from low visibility mode to high visibility mode need not occur, and a user can proceed directly to an actuation of the actuatable interface by clicking on the indicator while it is still in low visibility mode. The third indicator 742 can be configured to, upon actuation, change the display in content interface 310 to the next sheet with comments (for purposes of example, this can be SHEET 3), as well as display a third comment list in the comment interface 320.

Furthermore, it can be seen that the third indicator 742 is spaced apart from the seventh comment 702 by a second distance 750. The second distance 750 can be configured to clearly distinguish the third indicator 742 from the comments above. In other words, the comment indicator may be spaced apart and/or isolated (i.e., be spaced apart from comments in some implementations. For example, in FIG. 7, the distance between the third indicator 742 and seventh comment 702 is greater than intercomment distance 552. In other words, there is relatively more space extending between the indicator and the comment than there is between two neighboring comments. In some implementations, the second distance 750 can be substantially similar to first distance 550 (see FIG. 5), and/or there can be a standard or default minimum spacing between a comment indicator and the nearest comment (if any), which can add to the uniformity and predictability of the user experience. Furthermore, the second distance 750 can be of sufficient size that the transition from low visibility mode to high visibility mode (in response to a mouseover event, for example) can occur (a) without obstruction of the nearest comment by the comment indicator, and/or (b) without requiring the comments to be pushed up to accommodate the display of the larger-sized comment indicator.

As described above, in different implementations, the appearance of a comment indicator can differ relative to the appearance of standard comments. In some implementations, the comment indicator's overall appearance and/or its interior contents can be 'ghosted', translucent, have a faded or translucent appearance, and/or seem substantially transparent. Such effects can help minimize the potential disruption to workflow for a currently viewed sheet, and accentuate the difference between comments and comment indicators in a comment list. In some implementations, this and other low visibility appearance parameters may be part of default appearance settings for the comment indicators, while in other implementations, low visibility appearance parameters (e.g., transparency, ghosted effect, brightness, line type and format, line weight, symbolic representations of text, the extent of the cropped/reduced size, rapidity and/or duration of transition between low and high visibility in response to user input, rapidity and/or duration of transition between high and low visibility in response to the removal of the user input, etc.) are selected or adjusted by a user.

Figure 8:
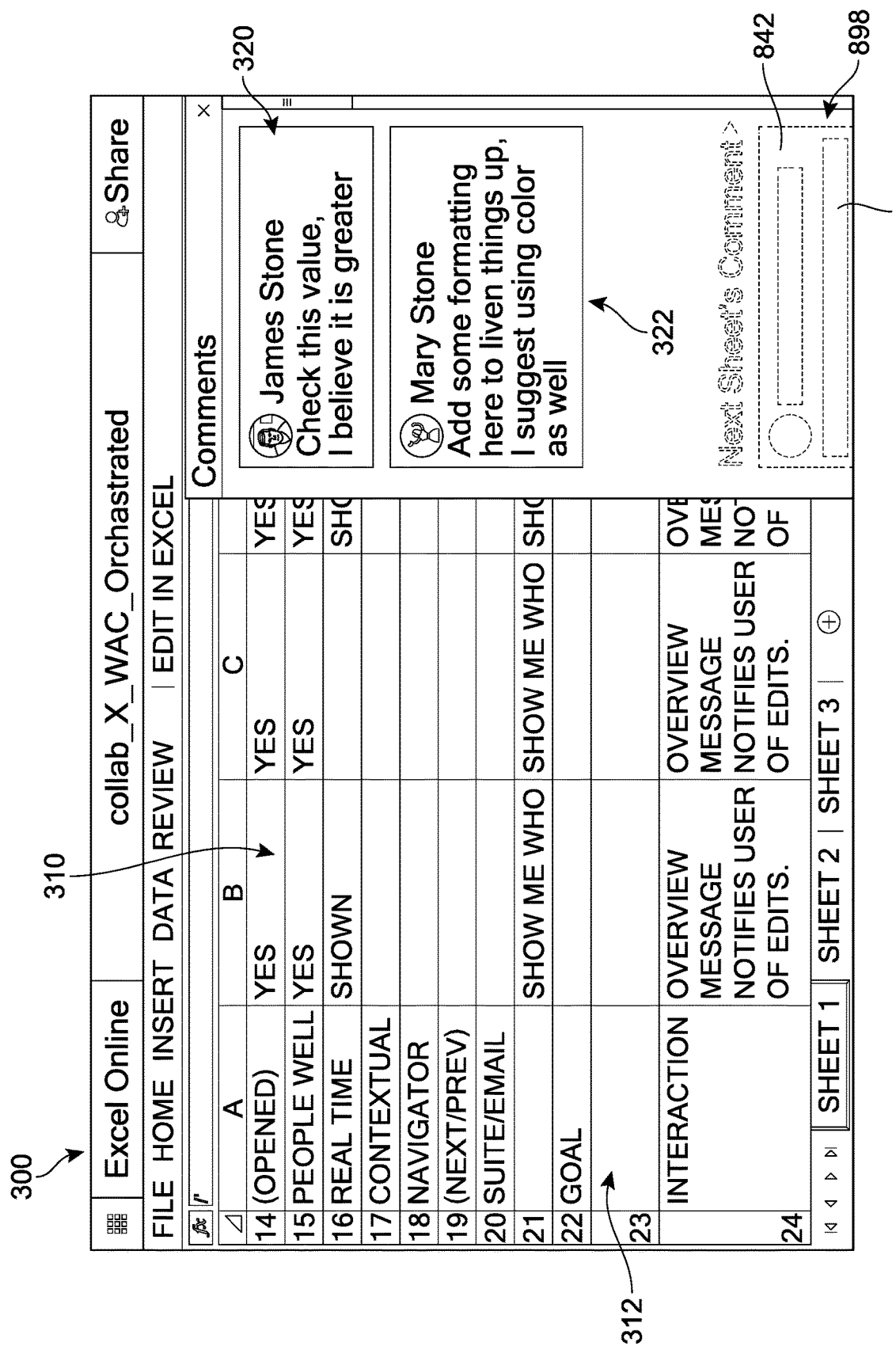
FIG. 8 is a display diagram illustrating an implementation of a spreadsheet application with a comment interface including a comment indicator with a ghosted effect.

One example of this is shown in FIG. 8, where the first sheet 312 is again shown, along with a modified or ghosted first indicator 842. However, in contrast to FIG. 3, where the first indicator 342 appeared relatively solid or of a normal line weight, the ghosted first indicator 842 is significantly less solid or apparent than the graphics comprising the comments. Such a ghosted effect 898 can allow the comment indicator to remain substantially inconspicuous, minimizing workflow disruption, until a user actively decides to engage with the indicator and any subsequent/previous comments. In some implementations, once a mouseover event occurs, the ghosted comment indicator can transition (immediately or gradually) to a solid appearance, and/or shift to a "reveal" or high visibility mode. In other implementations, a mouseover event may only prompt the shift of the indicator to a substantially high visibility mode, while it retains the ghosted effect.

Figure 9:
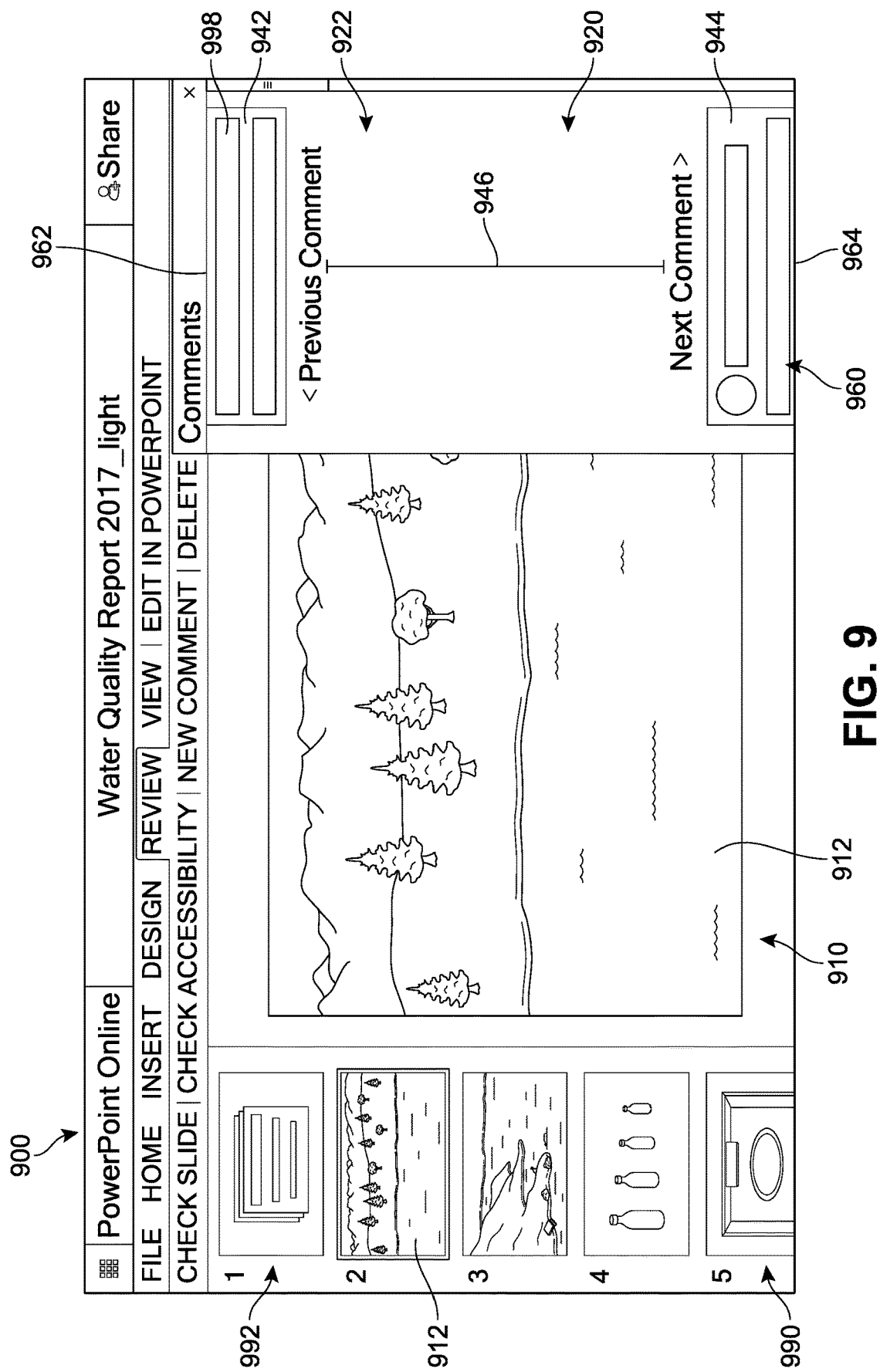
FIG. 9 is a display diagram illustrating an implementation of a presentation application with a content interface presenting a first slide, and a comment interface including a first comment indicator and a second comment indicator in a low visibility mode.
Figure 10:
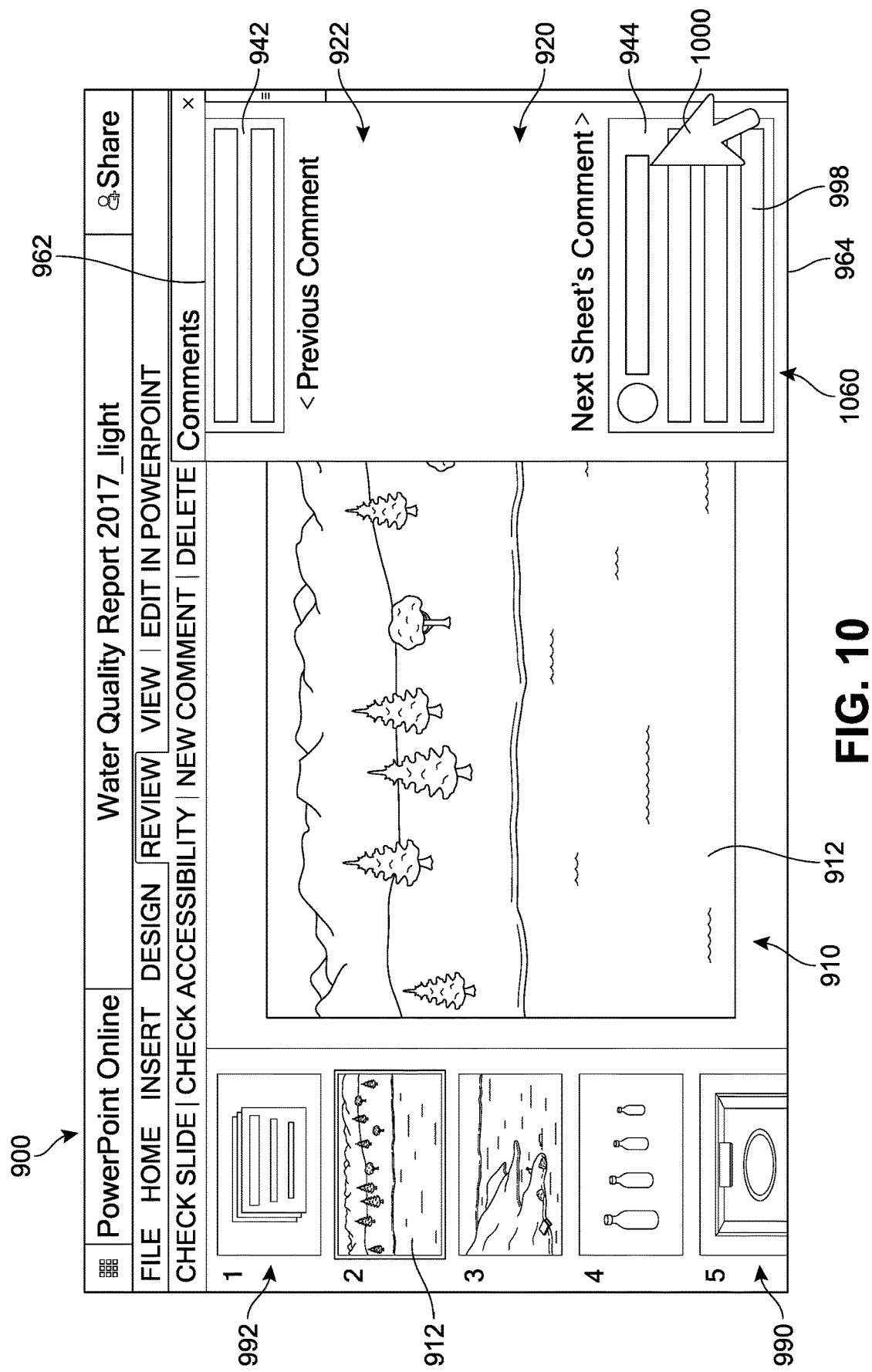
FIG. 10 is a display diagram illustrating an implementation of the presentation application with the comment interface including the first comment indicator in low visibility mode and the second comment indicator in a high visibility mode.
Figure 11:
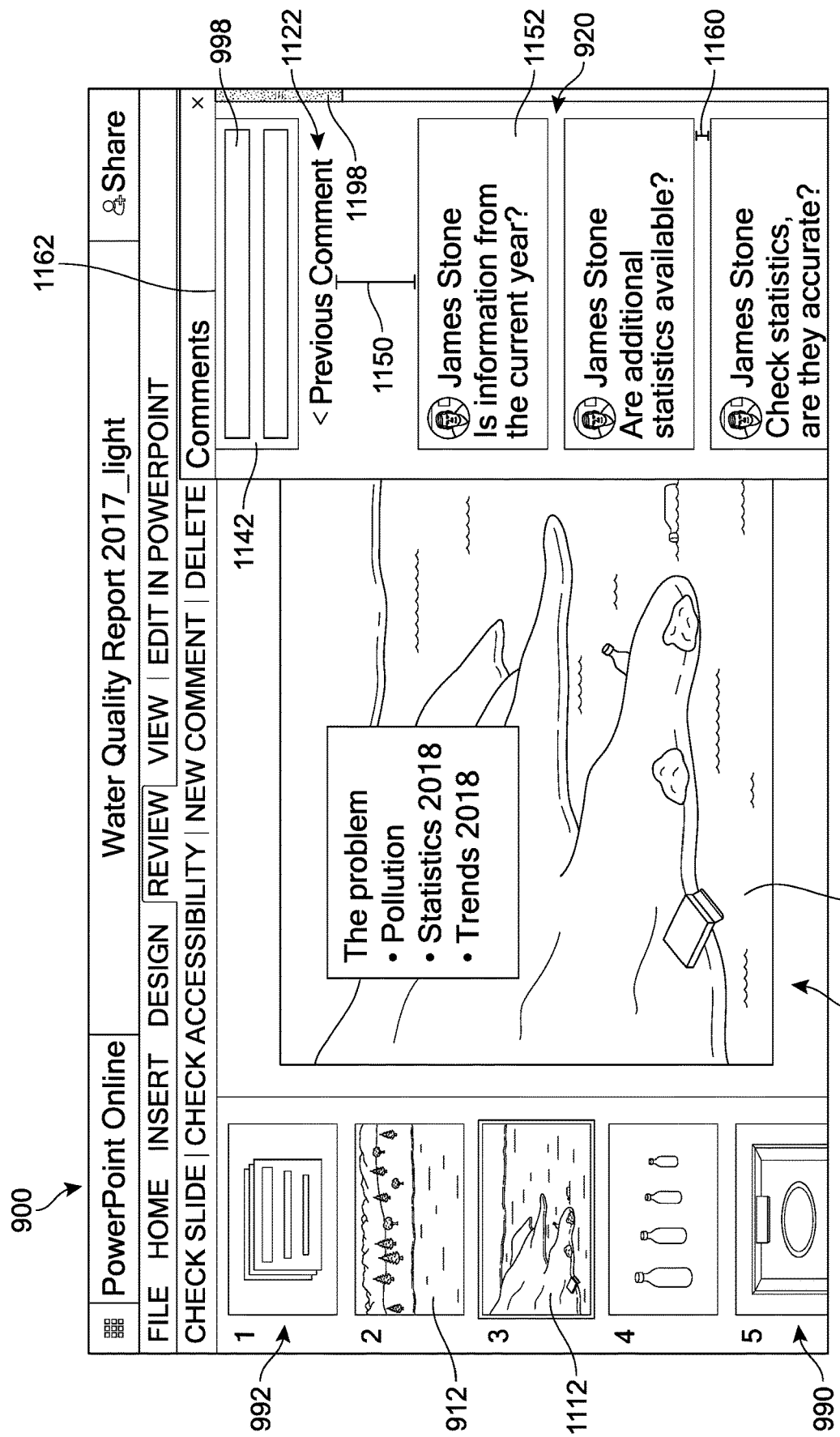
FIG. 11 is a display diagram illustrating an implementation of the presentation application with the content interface presenting a second slide, and the comment interface including a third comment indicator in a low visibility mode.

In order to allow the reader to better appreciate some of the implementations of the proposed systems, an example of a comment indicator process for a slideshow application will be presented now with reference to FIGS. 9-11. In FIG. 9, a presentation or slideshow application 900 is depicted that includes a content interface 910 and a comment interface 920. An optional slideshow preview pane 990 is also depicted, disposed on a side opposite to the comment interface 920 in this example. As noted above, collaboratively edited electronic documents frequently include comments distributed throughout the electronic document. As users view the document, they usually view both the content of the electronic document and any associated comments. The comments are typically presented in a context that allows a user to determine which portion of the content is linked to a particular comment. In this example, the content interface 910 displays a first slide 912, and the slideshow preview pane 990 displays a plurality of slides 992 that include the document, here including four slides. Other implementations can include any number of slides. In addition, the comment interface 920 displays a first comment list 922. The first comment list 922 includes a first indicator 942 and a second indicator 944, where the first indicator 942 and the second indicator 944 are spaced apart by a third distance 946. The third distance 946 corresponds to the spacing that occurs when no comments are available for the currently viewed slide, and the comment indicator(s) are the only elements in the comment list. In other words, the indicator for a 'previous' comment remains proximate to the top or a first end of the comment interface 920, and the indicator for a 'next' comments remains proximate to the bottom or a second end of the comment interface 920, even when there are no comments available for the current page.

It should be understood that the comment indicators that are incorporated in this type of presentation application can include all of the characteristics, features, aspects, and functions of the comment indicators described above with respect to FIGS. 1-8. For example, each of the comment indicators can be configured as relatively simple graphical representations with little to no substantive content, and/or have a relatively subtle or unobtrusive appearance. Specifically, in FIG. 9, the information presented in the first indicator 942 is limited to a symbolic representation 998 of upcoming text.

In addition, in some implementations, an appearance of one or both of the comment indicators can apply or embody a ghosted effect (see FIG. 8), thereby augmenting the low visibility aspect. The first indicator 942 is disposed proximate to an uppermost edge of the comment interface 920 or first end 962 of the comment list 922 and the second indicator 944 is disposed proximate to a lower or bottommost edge of the comment interface 920 or a second end 964 of the first comment list 922. The comment indicators are initially displayed in a low visibility mode 960. Following a user input event (e.g., a mouseover event), the indicator can transition to high visibility mode. This is illustrated in FIG. 10 where a cursor 1000 is shown disposed "atop" or "above" the comment indicator. The system can respond by transitioning the comment indicator to a high visibility mode 1060, which can include an increase in the line weight or a decrease of the ghosted effect if the comment indicator had been ghosted.

Upon actuation (e.g., a mouse-click or other input-selection) of the actuatable interface comprising a comment indicator, the system can be configured to respond by display of a different slide in the content interface 910 as well as a different comment list in the comment interface 920. As shown in FIG. 11, as a result of actuation of the second indicator 944, the content interface 910 now displays a second slide 1112 and the comment interface 920 now displays a second comment list 1122. The second comment list 1122 can be seen to differ from the first comment list 922 of FIGS. 9 and 10; whereas the first comment list 922 did not include any comments, the second comment list 1122 includes a plurality of comments that are associated with content of the currently viewed discrete segment (second slide 1112). In addition, the first indicator 942 and second indicator 944 of FIGS. 9 and 10 have been removed. Instead, the second comment list 1122 includes comments that are of a length or number resulting in the comment interface 920 including a scrollable pane 1198, permitting a user to navigate through all of the comments for the current discrete segment. In the example of FIG. 11, the second comment list 1122 is shown to include at least four comments. Additional comments and/or another comment indicator may be revealed when a user scrolls through the list, and/or there may be a comment indicator available at the bottom of the second comment list 1122 that becomes visible when the list has been 'scrolled up'. In other implementations, the comment interface can also include a text response field, where one or more of the comments can receive, store and/or communicate replies associated with a particular comment.

As noted earlier, in some implementations, the system can include provisions for informing the user as to the availability of comments on a previous sheet or page. For example, there can be a comment indicator that is associated with a comment for content that occurred earlier in the sequence, rather than later. This is illustrated in FIG. 11, where a third indicator 1142 is displayed proximate to an uppermost edge of the comment interface 920, or a first end 1162 of the second comment list 1122. The characteristics of the third indicator 1142 can include all aspects, details, and features described above with respect to implementations of the comment indicators. In addition, the spacing between the third indicator 1142 and a first comment 1152 (a fourth distance 1150) is greater than an intercomment distance 1160. In some implementations, the fourth distance 1150 can be 1.5 to 3 times greater than the intercomment distance 1160. In another example, the fourth distance 1150 can be at least greater than a height of the low visibility comment indicator.

Figure 12:
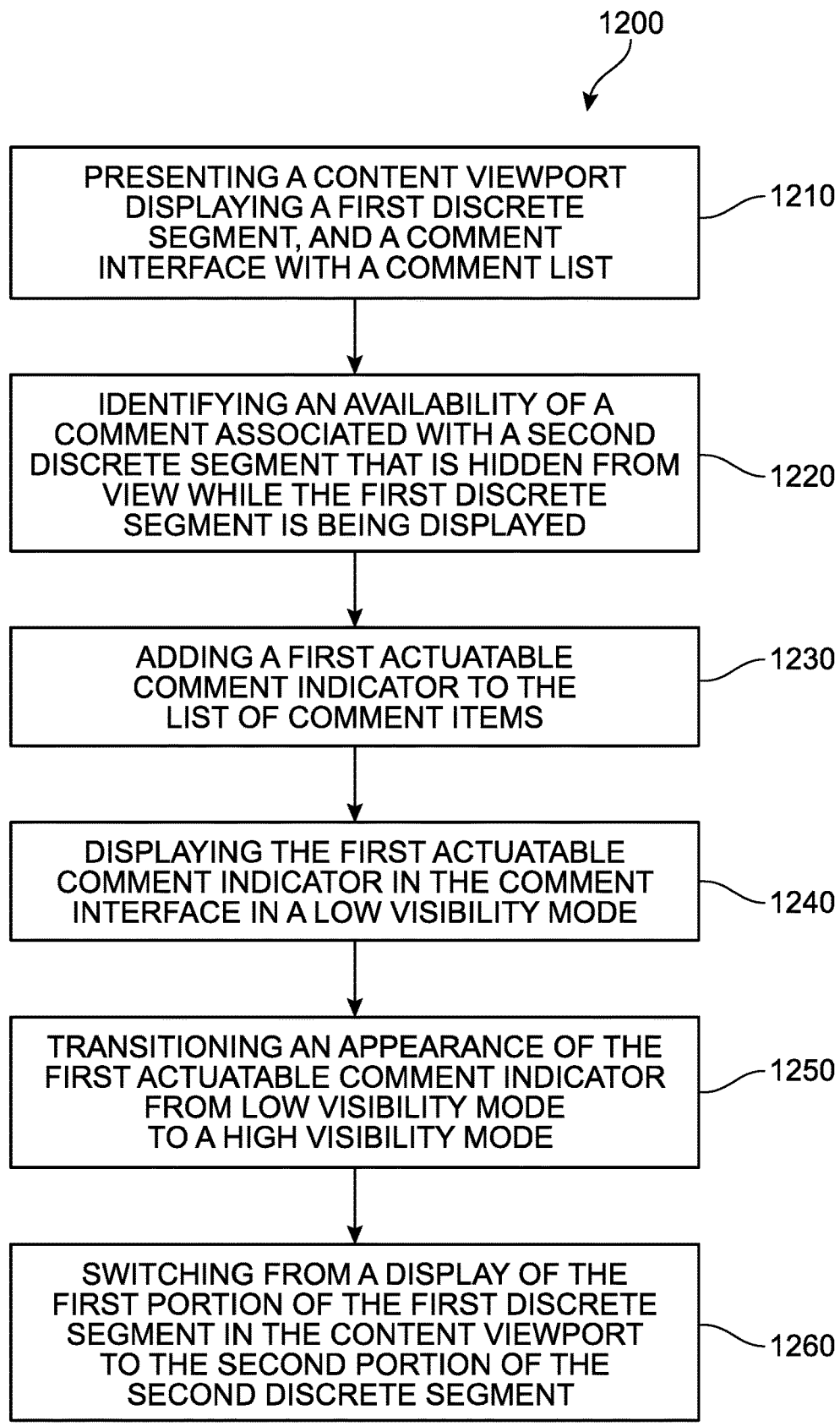
FIG. 12 is a flow diagram illustrating an implementation of a process for managing comment notifications.

FIG. 12 is a flow chart illustrating an implementation of a method 1200 of managing the presentation of comments and comment indicators while viewing electronic content. In FIG. 12, a first step 1210 includes presenting, on a display of a user device, a graphical user interface including a content interface and a comment interface. The content interface is configured to display at least a first portion of a first discrete segment in a sequence of electronic content, where the sequence of electronic content including a plurality of discrete segments, and the comment interface is configured to display a list comprising of one or more comment items. A second step 1220 includes identifying an availability of a first comment associated with a second portion of a second discrete segment in the sequence of electronic content, where the second discrete segment is hidden from view while the first discrete segment is being displayed. A third step 1230 involves adding, in response to identifying the availability of the first comment, a first actuatable comment indicator to the list of comment items. In some implementations, the first actuatable comment indicator is configured to enable automatic navigation to the second portion.

A fourth step 1240 includes displaying the first actuatable comment indicator in the comment interface. The first actuatable comment indicator is initially in a low visibility mode. A fifth step 1250 can include transitioning, in response to a first user input event associated with the first actuatable comment indicator, an appearance of the first actuatable comment indicator from low visibility mode to a high visibility mode during the first user input event. Furthermore, some implementations can further include a sixth step 1260 of switching, in response to actuation of the first actuatable comment indicator, from a display of the first portion of the first discrete segment in the content interface to a display of at least the second portion of the second discrete segment in the content interface.

In different implementations, the display of the first actuatable content indicator (fourth step 1240) can alternatively be configured initially to conceal any text from appearing in an interior region of the first actuatable comment indicator. In other implementations, additional steps may be included. For example, in some implementations, the method also includes removing the first actuatable comment indicator from the comment interface display after actuation of the first actuatable comment indicator. In another example, the method may include displaying the first comment in the comment interface. In some implementations, the comment interface includes a first end and a second end, and the method further includes steps of presenting the first actuatable comment indicator in the comment interface proximate to (a) the second end of the comment interface when the second discrete segment is subsequent to the first discrete segment in the sequence, and (b) the first end of the comment interface when the second discrete segment is prior to the first discrete segment in the sequence.

In other implementations the first actuatable comment indicator includes an outline that is initially translucent, and the method further involves solidifying, in response to the first user input event associated with the first actuatable comment indicator, the outline of the first actuatable comment indicator. In one implementation, the list of comment items includes a plurality of comments that are associated with the first discrete segment, and the method further involves concealing the first actuatable comment indicator when the plurality of comments being displayed in the comment interface extends between the first end and the second end. In another implementation, the method can include identifying an availability of a second comment associated with a third portion of a third discrete segment in the sequence of electronic content, the third discrete segment being hidden from view while the second discrete segment is being displayed, as well as adding, in response to identifying the availability of second comment, a second actuatable comment indicator to the list of comment items, the second actuatable comment indicator being configured to enable a user to navigate to the third portion. In addition, the method can include displaying the second actuatable comment indicator in the comment interface, wherein the second actuatable comment indicator is initially in a low visibility mode, and transitioning, in response to a first user input event associated with the second actuatable comment indicator, an appearance of the second actuatable comment indicator from low visibility mode to a high visibility mode during the first user input event. In other words, the second actuatable comment indicator can be revealed in its entirety, rather than in its cropped or abbreviated form. The method may further involve switching, in response to actuation of the second actuatable comment indicator, from a display of the second discrete segment in the content interface to a display of at least the third portion of the third discrete segment in the content interface.

In some other implementations, the method also includes identifying an availability of a second comment associated with the first portion of the first discrete segment in the sequence of electronic content, and then adding, in response to identifying the availability of second comment, a second actuatable comment indicator to the list of comment items, the second actuatable comment indicator being configured to enable a user to return to the first portion. This can be followed by a step of displaying the second actuatable comment indicator in the comment interface, wherein the second actuatable comment indicator is initially in a low visibility mode, and then transitioning, in response to a first user input event associated with the second actuatable comment indicator, an appearance of the second actuatable comment indicator from low visibility mode to a high visibility mode during the first user input event. The method may further include switching, in response to actuation of the second actuatable comment indicator, from a display of the second discrete segment in the content interface to a display of at least the first portion of the first discrete segment in the content interface.

In some cases, an interior of the first actuatable comment indicator is blank, and in other cases, an interior of the first actuatable comment indicator includes a placeholder represented or symbolized by what appears to be redacted text, or blocked elongated strips. In other implementations, the comment indicator can include substantially illegible or indiscernible content, such that what is displayed in an interior region of the comment indicator is not clear enough to be read. In one implementation, the electronic content includes a database, and the first discrete segment and the second discrete segment each correspond to an individual worksheet in the database. In other implementations, the electronic content includes a slideshow, and the first discrete segment and the second discrete segment each correspond to an individual slide in the slideshow.

In addition, while the comment indicators are described as notifying a user of the availability or presence of comments on other pages, it should be understood that this system may also be configured to indicate other kinds of information as well. This can occur when some information or data is linked or otherwise associated with a portion of a discrete segment that is currently not being displayed, a user may be provided with a notification that such information exists. As one example, there may be changes or revisions made to other segments of the document; in such cases, the comment indicator can be a revision indicator, that allows a user to navigate directly to the next change or edit that has occurred in the document.

Thus, in some implementations, the disclosed implementations can be applied to a method of managing the presentation of revisions or edits while viewing electronic content. For example, a first step may include presenting, on a display of a user device, a graphical user interface including a content interface and an edits interface. The content interface is configured to display at least a first portion of a first discrete segment in a sequence of electronic content, where the sequence of electronic content including a plurality of discrete segments, and the edits interface is configured to display a list comprising of one or more changes made to the document. A second step can include identifying an availability of a first edit associated with a second portion of a second discrete segment in the sequence of electronic content, where the second discrete segment is hidden from view while the first discrete segment is being displayed. A third step may involve adding, in response to identifying the availability of the first edit, a first edit indicator to the list of edit items. In some implementations, the first edit indicator is configured to enable automatic navigation to the second portion.

A fourth step can include displaying the first edit indicator in the edit interface. The first edit indicator can initially be presented in a low visibility mode. A fifth step can include transitioning, in response to a first user input event associated with the first edit indicator, an appearance of the first edit indicator from low visibility mode to a high visibility mode during the first user input event. Furthermore, some implementations can further include a sixth step of switching, in response to an actuation of the first edit indicator, from a display of the first portion of the first discrete segment in the content interface to a display of at least the second portion of the second discrete segment in the content interface.

It should be understood that all references to "comment(s)" throughout this description (e.g., comment interface, comment indicator, comment list, list of comment items, comment availability, previous comment, subsequent comment, etc.) may be substituted to instead implement a mechanism for managing track changes, edits, revisions, or other information that has been linked or associated with different sections of the electronic content. For example, each of the examples described herein may alternatively be directed to a system that provides an edit interface, edit indicators, edits list, lists of edit items, edit availability detection, edits associated with previous discrete segments, edits associated with subsequent discrete segments, etc. Thus, it is to be understood that there are many possible combinations of the features that are shown in the accompanying figures and discussed in this detailed description, and each of these features may be implemented to provide an edit notification method and/or system.

The detailed examples of systems, devices, and techniques described in connection with FIGS. 1-12 are presented herein for illustration of the disclosure and its benefits. Such examples of use should not be construed to be limitations on the logical process implementations of the disclosure, nor should variations of user interface methods from those described herein be considered outside the scope of the present disclosure. In some implementations, various features described in FIGS. 1-12 are implemented in respective modules, which may also be referred to as, and/or include, logic, components, units, and/or mechanisms. Modules may constitute either software modules (for example, code embodied on a machine-readable medium) or hardware modules.

In some examples, a hardware module may be implemented mechanically, electronically, or with any suitable combination thereof. For example, a hardware module may include dedicated circuitry or logic that is configured to perform certain operations. For example, a hardware module may include a special-purpose processor, such as a field-programmable gate array (FPGA) or an Application Specific Integrated Circuit (ASIC). A hardware module may also include programmable logic or circuitry that is temporarily configured by software to perform certain operations, and may include a portion of machine-readable medium data and/or instructions for such configuration. For example, a hardware module may include software encompassed within a programmable processor configured to execute a set of software instructions. It will be appreciated that the decision to implement a hardware module mechanically, in dedicated and permanently configured circuitry, or in temporarily configured circuitry (for example, configured by software) may be driven by cost, time, support, and engineering considerations.

Accordingly, the phrase "hardware module" should be understood to encompass a tangible entity capable of performing certain operations and may be configured or arranged in a certain physical manner, be that an entity that is physically constructed, permanently configured (for example, hardwired), and/or temporarily configured (for example, programmed) to operate in a certain manner or to perform certain operations described herein. As used herein, "hardware-implemented module" refers to a hardware module. Considering examples in which hardware modules are temporarily configured (for example, programmed), each of the hardware modules need not be configured or instantiated at any one instance in time. For example, where a hardware module includes a programmable processor configured by software to become a special-purpose processor, the programmable processor may be configured as respectively different special-purpose processors (for example, including different hardware modules) at different times. Software may accordingly configure a particular processor or processors, for example, to constitute a particular hardware module at one instance of time and to constitute a different hardware module at a different instance of time. A hardware module implemented using one or more processors may be referred to as being "processor implemented" or "computer implemented."

Hardware modules can provide information to, and receive information from, other hardware modules. Accordingly, the described hardware modules may be regarded as being communicatively coupled. Where multiple hardware modules exist contemporaneously, communications may be achieved through signal transmission (for example, over appropriate circuits and buses) between or among two or more of the hardware modules. In implementations in which multiple hardware modules are configured or instantiated at different times, communications between such hardware modules may be achieved, for example, through the storage and retrieval of information in memory devices to which the multiple hardware modules have access. For example, one hardware module may perform an operation and store the output in a memory device, and another hardware module may then access the memory device to retrieve and process the stored output.

In some examples, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by, and/or among, multiple computers (as examples of machines including processors), with these operations being accessible via a network (for example, the Internet) and/or via one or more software interfaces (for example, an application program interface (API)). The performance of certain of the operations may be distributed among the processors, not only residing within a single machine, but deployed across a number of machines. Processors or processor-implemented modules may be located in a single geographic location (for example, within a home or office environment, or a server farm), or may be distributed across multiple geographic locations.

Figure 13:
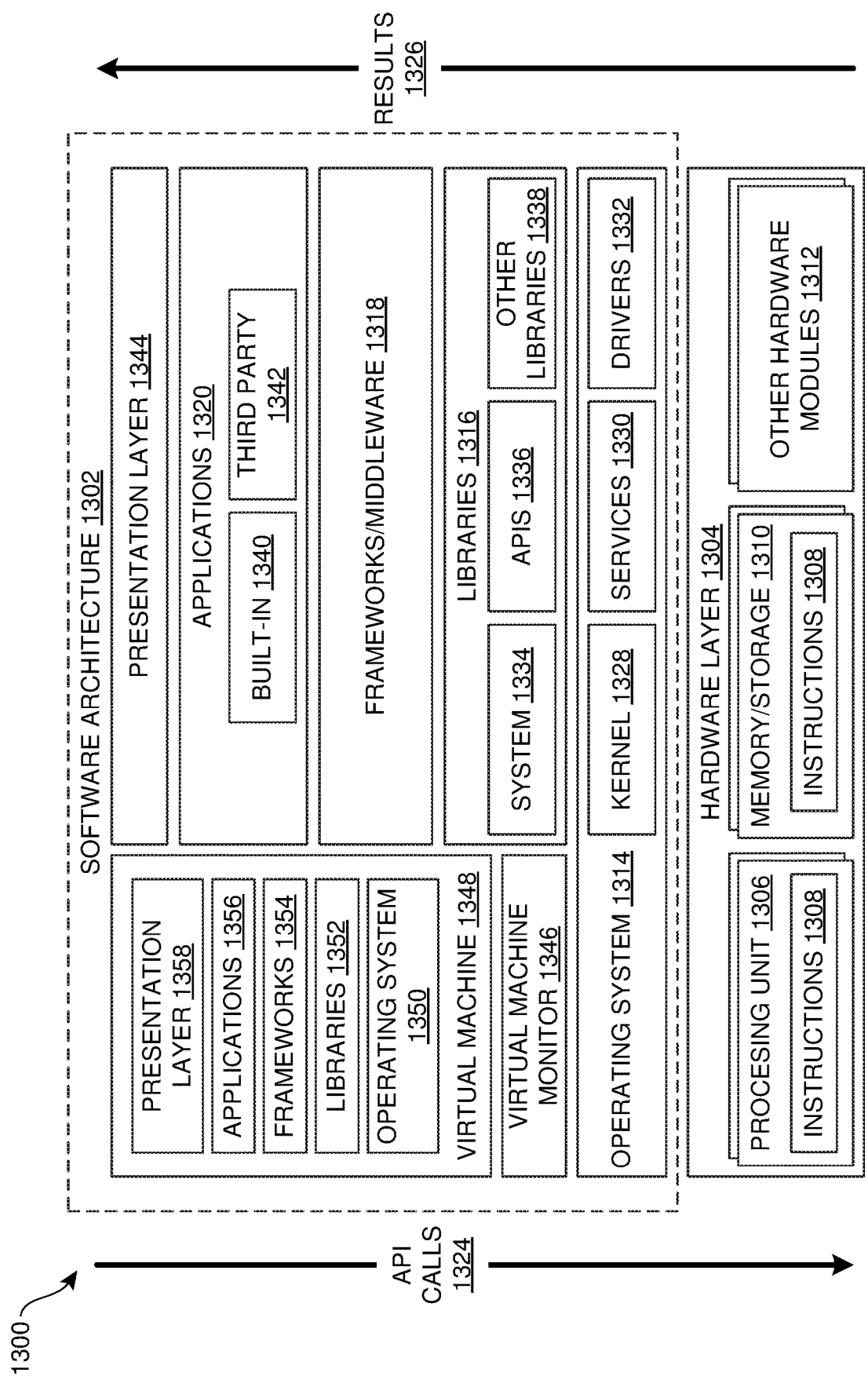
FIG. 13 is a block diagram of an example computing device, which may be used to provide implementations of the mechanisms described herein.

FIG. 13 is a block diagram 1300 illustrating an example software architecture 1302, various portions of which may be used in conjunction with various hardware architectures herein described, which may implement any of the above-described features. FIG. 13 is a non-limiting example of a software architecture and it will be appreciated that many other architectures may be implemented to facilitate the functionality described herein. The software architecture 1302 may execute on hardware such as a device 140 of FIG. 1A that includes, among other things, document storage 1070, processors, memory, and input/output (I/O) components. A representative hardware layer 1304 is illustrated and can represent, for example, the device 140 of FIG. 1. The representative hardware layer 1304 includes a processing unit 1306 and associated executable instructions 1308. The executable instructions 1308 represent executable instructions of the software architecture 1302, including implementation of the methods, modules and so forth described herein. The hardware layer 1304 also includes a memory/storage 1310, which also includes the executable instructions 1308 and accompanying data. The hardware layer 1304 may also include other hardware modules 1312. Instructions 1308 held by processing unit 1308 may be portions of instructions 1308 held by the memory/storage 1310.

The example software architecture 1302 may be conceptualized as layers, each providing various functionality. For example, the software architecture 1302 may include layers and components such as an operating system (OS) 1314, libraries 1316, frameworks 1318, applications 1320, and a presentation layer 1344. Operationally, the applications 1320 and/or other components within the layers may invoke API calls 1324 to other layers and receive corresponding results 1326. The layers illustrated are representative in nature and other software architectures may include additional or different layers. For example, some mobile or special purpose operating systems may not provide the frameworks/middleware 1318.

The OS 1314 may manage hardware resources and provide common services. The OS 1314 may include, for example, a kernel 1328, services 1330, and drivers 1332. The kernel 1328 may act as an abstraction layer between the hardware layer 1304 and other software layers. For example, the kernel 1328 may be responsible for memory management, processor management (for example, scheduling), component management, networking, security settings, and so on. The services 1330 may provide other common services for the other software layers. The drivers 1332 may be responsible for controlling or interfacing with the underlying hardware layer 1304. For instance, the drivers 1332 may include display drivers, camera drivers, memory/storage drivers, peripheral device drivers (for example, via Universal Serial Bus (USB)), network and/or wireless communication drivers, audio drivers, and so forth depending on the hardware and/or software configuration.

The libraries 1316 may provide a common infrastructure that may be used by the applications 1320 and/or other components and/or layers. The libraries 1316 typically provide functionality for use by other software modules to perform tasks, rather than rather than interacting directly with the OS 1314. The libraries 1316 may include system libraries 1334 (for example, C standard library) that may provide functions such as memory allocation, string manipulation, file operations. In addition, the libraries 1316 may include API libraries 1336 such as media libraries (for example, supporting presentation and manipulation of image, sound, and/or video data formats), graphics libraries (for example, an OpenGL library for rendering 2D and 3D graphics on a display), database libraries (for example, SQLite or other relational database functions), and web libraries (for example, WebKit that may provide web browsing functionality). The libraries 1316 may also include a wide variety of other libraries 1338 to provide many functions for applications 1320 and other software modules.

The frameworks 1318 (also sometimes referred to as middleware) provide a higher-level common infrastructure that may be used by the applications 1320 and/or other software modules. For example, the frameworks 1318 may provide various graphic user interface (GUI) functions, high-level resource management, or high-level location services. The frameworks 1318 may provide a broad spectrum of other APIs for applications 1320 and/or other software modules.

The applications 1320 include built-in applications 1340 and/or third-party applications 1342. Examples of built-in applications 1340 may include, but are not limited to, a contacts application, a browser application, a location application, a media application, a messaging application, and/or a game application. Third-party applications 1342 may include any applications developed by an entity other than the vendor of the particular platform. The applications 1320 may use functions available via OS 1314, libraries 1316, frameworks 1318, and presentation layer 1344 to create user interfaces to interact with users.

Some software architectures use virtual machines, as illustrated by a virtual machine 1348. The virtual machine 1348 provides an execution environment where applications/modules can execute as if they were executing on a hardware machine (such as the machine 1000 of FIG. 10, for example). The virtual machine 1348 may be hosted by a host OS (for example, OS 1314) or hypervisor, and may have a virtual machine monitor 1346 which manages operation of the virtual machine 1348 and interoperation with the host operating system. A software architecture, which may be different from software architecture 1302 outside of the virtual machine, executes within the virtual machine 1348 such as an OS 1350, libraries 1352, frameworks 1354, applications 1356, and/or a presentation layer 1358.

Figure 14:
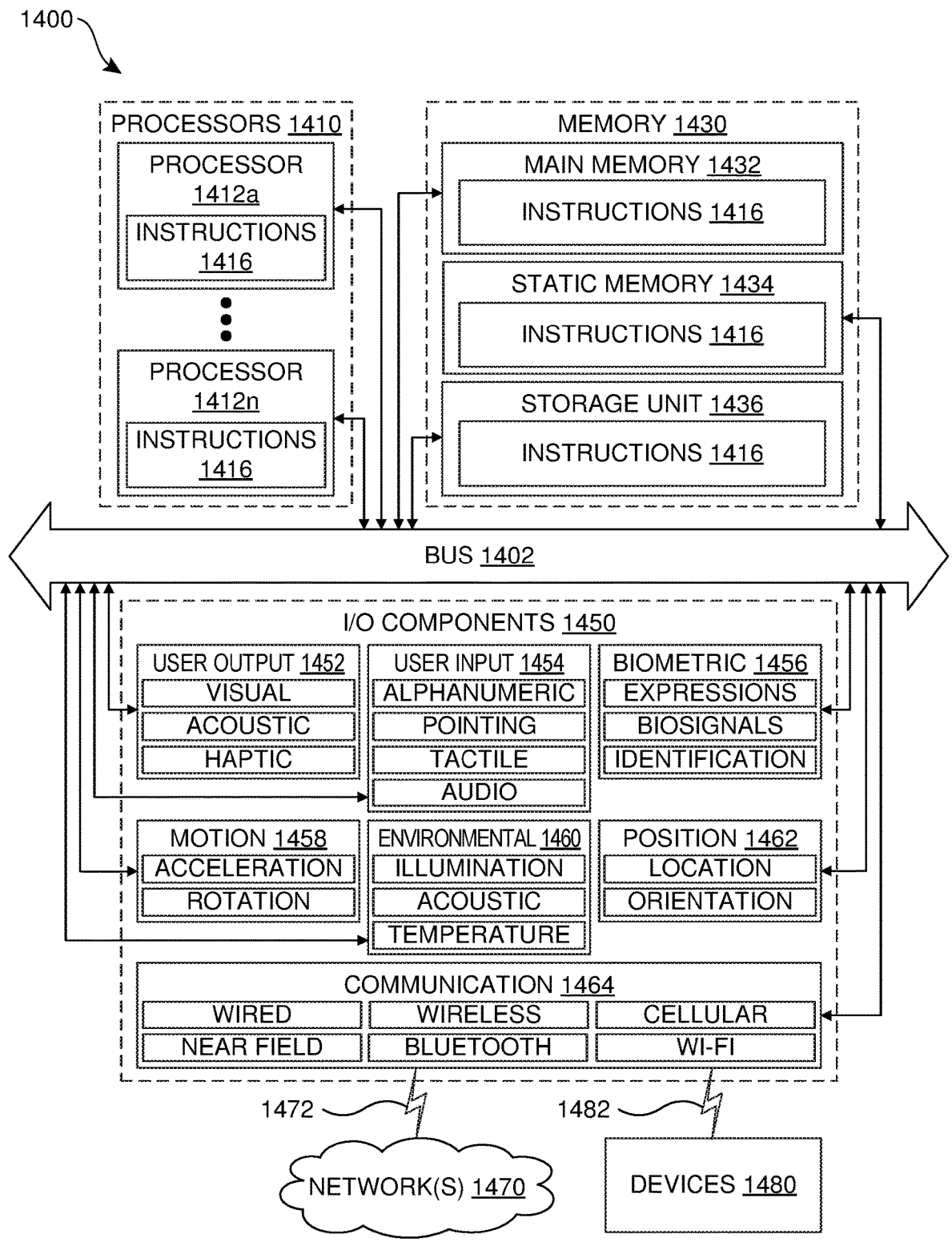
FIG. 14 is a block diagram illustrating components of an example machine configured to read instructions from a machine-readable medium.

FIG. 14 is a block diagram illustrating components of an example machine 1400 configured to read instructions from a machine-readable medium (for example, a machine-readable storage medium) and perform any of the features described herein. The example machine 1400 is in a form of a computer system, within which instructions 1416 (for example, in the form of software components) for causing the machine 1400 to perform any of the features described herein may be executed. As such, the instructions 1416 may be used to implement modules or components described herein. The instructions 1416 cause unprogrammed and/or unconfigured machine 1400 to operate as a particular machine configured to carry out the described features. The machine 1400 may be configured to operate as a standalone device or may be coupled (for example, networked) to other machines. In a networked deployment, the machine 1400 may operate in the capacity of a server machine or a client machine in a server-client network environment, or as a node in a peer-to-peer or distributed network environment. Machine 1400 may be embodied as, for example, a server computer, a client computer, a personal computer (PC), a tablet computer, a laptop computer, a netbook, a set-top box (STB), a gaming and/or entertainment system, a smart phone, a mobile device, a wearable device (for example, a smart watch), and an Internet of Things (IoT) device. Further, although only a single machine 1400 is illustrated, the term "machine" includes a collection of machines that individually or jointly execute the instructions 1416.

The machine 1400 may include processors 1410, memory 1430, and I/O components 1450, which may be communicatively coupled via, for example, a bus 1402. The bus 1402 may include multiple buses coupling various elements of machine 1400 via various bus technologies and protocols. In an example, the processors 1410 (including, for example, a central processing unit (CPU), a graphics processing unit (GPU), a digital signal processor (DSP), an ASIC, or a suitable combination thereof) may include one or more processors $1412a$ to $1412n$ that may execute the instructions 1416 and process data. In some examples, one or more processors 1410 may execute instructions provided or identified by one or more other processors 1410. The term "processor" includes a multi-core processor including cores that may execute instructions contemporaneously. Although FIG. 14 shows multiple processors, the machine 1400 may include a single processor with a single core, a single processor with multiple cores (for example, a multi-core processor), multiple processors each with a single core, multiple processors each with multiple cores, or any combination thereof. In some examples, the machine 1400 may include multiple processors distributed among multiple machines.

The memory/storage 1430 may include a main memory 1432, a static memory 1434, or other memory, and a storage unit 1436, both accessible to the processors 1410 such as via the bus 1402. The storage unit 1436 and memory 1432, 1434 store instructions 1416 embodying any one or more of the functions described herein. The memory/storage 1430 may also store temporary, intermediate, and/or long-term data for processors 1410. The instructions 1416 may also reside, completely or partially, within the memory 1432, 1434, within the storage unit 1436, within at least one of the processors 1410 (for example, within a command buffer or cache memory), within memory at least one of I/O components 1450, or any suitable combination thereof, during execution thereof. Accordingly, the memory 1432, 1434, the storage unit 1436, memory in processors 1410, and memory in I/O components 1450 are examples of machine-readable media.

As used herein, "machine-readable medium" refers to a device able to temporarily or permanently store instructions and data that cause machine 1400 to operate in a specific fashion. The term "machine-readable medium," as used herein, does not encompass transitory electrical or electromagnetic signals per se (such as on a carrier wave propagating through a medium); the term "machine-readable medium" may therefore be considered tangible and non-transitory. Non-limiting examples of a non-transitory, tangible machine-readable medium may include, but are not limited to, nonvolatile memory (such as flash memory or read-only memory (ROM)), volatile memory (such as a static random-access memory (RAM) or a dynamic RAM), buffer memory, cache memory, optical storage media, magnetic storage media and devices, network-accessible or cloud storage, other types of storage, and/or any suitable combination thereof. The term "machine-readable medium" applies to a single medium, or combination of multiple media, used to store instructions (for example, instructions 1416) for execution by a machine 1400 such that the instructions, when executed by one or more processors 1410 of the machine 1400, cause the machine 1400 to perform and one or more of the features described herein. Accordingly, a "machine-readable medium" may refer to a single storage device, as well as "cloud-based" storage systems or storage networks that include multiple storage apparatus or devices.

The I/O components 1450 may include a wide variety of hardware components adapted to receive input, provide output, produce output, transmit information, exchange information, capture measurements, and so on. The specific I/O components 1450 included in a particular machine will depend on the type and/or function of the machine. For example, mobile devices such as mobile phones may include a touch input device, whereas a headless server or IoT device may not include such a touch input device. The particular examples of I/O components illustrated in FIG. 14 are in no way limiting, and other types of components may be included in machine 1400. The grouping of I/O components 1450 are merely for simplifying this discussion, and the grouping is in no way limiting. In various examples, the I/O components 1450 may include user output components 1452 and user input components 1454. User output components 1452 may include, for example, display components for displaying information (for example, a liquid crystal display (LCD) or a projector), acoustic components (for example, speakers), haptic components (for example, a vibratory motor or force-feedback device), and/or other signal generators. User input components 1454 may include, for example, alphanumeric input components (for example, a keyboard or a touch screen), pointing components (for example, a mouse device, a touchpad, or another pointing instrument), and/or tactile input components (for example, a physical button or a touch screen that provides location and/or force of touches or touch gestures) configured for receiving various user inputs, such as user commands and/or selections.

In some examples, the I/O components 1450 may include biometric components 1456 and/or position components 1462, among a wide array of other environmental sensor components. The biometric components 1456 may include, for example, components to detect body expressions (for example, facial expressions, vocal expressions, hand or body gestures, or eye tracking), measure biosignals (for example, heart rate or brain waves), and identify a person (for example, via voice-, retina-, and/or facial-based identification). The position components 1462 may include, for example, location sensors (for example, a Global Position System (GPS) receiver), altitude sensors (for example, an air pressure sensor from which altitude may be derived), and/or orientation sensors (for example, magnetometers).

The I/O components 1450 may include communication components 1464, implementing a wide variety of technologies operable to couple the machine 1400 to network(s) 1470 and/or device(s) 1480 via respective communicative couplings 1472 and 1482. The communication components 1464 may include one or more network interface components or other suitable devices to interface with the network(s) 1470. The communication components 1464 may include, for example, components adapted to provide wired communication, wireless communication, cellular communication, Near Field Communication (NFC), Bluetooth communication, Wi-Fi, and/or communication via other modalities. The device(s) 1480 may include other machines or various peripheral devices (for example, coupled via USB).

In some examples, the communication components 1464 may detect identifiers or include components adapted to detect identifiers. For example, the communication components 1464 may include Radio Frequency Identification (RFID) tag readers, NFC detectors, optical sensors (for example, one- or multi-dimensional bar codes, or other optical codes), and/or acoustic detectors (for example, microphones to identify tagged audio signals). In some examples, location information may be determined based on information from the communication components 1462, such as, but not limited to, geo-location via Internet Protocol (IP) address, location via Wi-Fi, cellular, NFC, Bluetooth, or other wireless station identification and/or signal triangulation.

Furthermore, implementations of the present disclosure can make use of any of the features, systems, components, devices, and methods described in U.S. Pat. No. 9,965,475 to Gan et al., issued May 8, 2018 and titled "User Interface For Navigating Comments Associated With Collaboratively Edited Electronic Documents," the disclosure of which is herein incorporated by reference in its entirety.

While various implementations have been described, the description is intended to be exemplary, rather than limiting, and it is understood that many more implementations and implementations are possible that are within the scope of the implementations. Although many possible combinations of features are shown in the accompanying figures and discussed in this detailed description, many other combinations of the disclosed features are possible. Any feature of any implementation may be used in combination with or substituted for any other feature or element in any other implementation unless specifically restricted. Therefore, it will be understood that any of the features shown and/or discussed in the present disclosure may be implemented together in any suitable combination. Accordingly, the implementations are not to be restricted except in light of the attached claims and their equivalents. Also, various modifications and changes may be made within the scope of the attached claims.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various examples for the purpose of streamlining the disclosure. This method of disclosure is not to be interpreted as reflecting an intention that the claims require more features than are expressly recited in each claim. Rather, as the following claims reflect, inventive subject matter lies in less than all features of a single disclosed example. Thus the following claims are hereby incorporated into the Detailed Description, with each claim standing on its own as a separately claimed subject matter.

What is claimed is:

1. A data processing device comprising:
   at least one processor; and
   one or more computer readable media including instructions which, when executed by the at least one processor, cause the at least one processor to:
   present, on a display, a graphical user interface including:
      a first region configured to display at least a first portion of a first discrete segment of electronic content in a sequence of electronic content, the sequence of electronic content including a plurality of discrete segments, and
      a second region configured to display a list comprising of one or more comment items;
   identify an availability of a first comment associated with a second portion of a second discrete segment in the plurality of discrete segments, the second discrete segment being hidden from view while the first discrete segment is being displayed;
   add, in response to identifying the availability of the first comment, a first actuatable comment indicator to the list of comment items;
   display the first actuatable comment indicator in the second region, wherein the first actuatable comment indicator is initially in a low visibility mode; and
   transition, in response to a first user input event associated with the first actuatable comment indicator, an appearance of the first actuatable comment indicator from low visibility mode to a high visibility mode during the first user input event.

2. The device of claim 1, wherein the instructions further cause the at least one processor to switch, in response to actuation of the first actuatable comment indicator, from a display of the first portion of the first discrete segment in the first region to a display of at least the second portion of the second discrete segment in the first region.

3. The device of claim 2, wherein the instructions further cause the at least one processor to:
   identify an availability of a second comment associated with the first portion of the first discrete segment in the sequence of electronic content;
   add, in response to identifying the availability of second comment, a second actuatable comment indicator to the list of comment items, the second actuatable comment indicator being configured to enable a user to return to the first portion;
   display the second actuatable comment indicator in the second region, wherein the second actuatable comment indicator is initially in low visibility mode;
   transition, in response to a second user input event associated with the second actuatable comment indicator, an appearance of the second actuatable comment indicator from low visibility mode to a high visibility mode during the second user input event; and
   switch, in response to actuation of the second actuatable comment indicator, from a display of the second discrete segment in the first region to a display of at least the first portion of the first discrete segment in the first region.

4. The device of claim 1, wherein the instructions further cause the at least one processor to remove the first actuatable comment indicator from the second region display after actuation of the first actuatable comment indicator.

5. A data processing device comprising:
   at least one processor; and
   one or more computer readable media including instructions which, when executed by the at least one processor, cause the at least one processor to:
   present, on a display, a graphical user interface including:
      a first region configured to display at least a first portion of a first discrete segment of electronic content in a sequence of electronic content, the sequence of electronic content including a plurality of discrete segments, and
      a second region configured to display a list comprising of one or more edit items;
   identify an availability of a first edit associated with a second portion of a second discrete segment in the plurality of discrete segments, the second discrete segment being hidden from view while the first discrete segment is being displayed;
   add, in response to identifying the availability of the first edit, a first edit indicator to the list of edit items; and
   display the first edit indicator in the second region, wherein the first edit indicator is initially configured to conceal any text from appearing in an interior region of the first edit indicator.

6. The device of claim 5, wherein the interior region of the first edit indicator includes at least one elongated strip symbolizing placeholder text.

7. The device of claim 5, wherein the electronic content comprises a database and the first discrete segment and the second discrete segment each correspond to an individual worksheet in the database.

8. The device of claim 5, wherein the electronic content comprises a slideshow and the first discrete segment and the second discrete segment each correspond to an individual slide in the slideshow.

9. A method comprising:
presenting, on a display of a user device, a graphical user interface including:
a first region configured to display at least a first portion of a first discrete segment in a sequence of electronic content, the sequence of electronic content including a plurality of discrete segments, and
a second region configured to display a list comprising of one or more comment items;
identifying an availability of a first comment associated with a second portion of a second discrete segment in the sequence of electronic content, the second discrete segment being hidden from view while the first discrete segment is being displayed;
adding, in response to identifying the availability of the first comment, a first actuatable comment indicator to the list of comment items, the first actuatable comment indicator being configured to enable a user to navigate to the second portion;
displaying the first actuatable comment indicator in the second region, wherein the first actuatable comment indicator is initially in a low visibility mode; and
transitioning, in response to a first user input event associated with the first actuatable comment indicator, an appearance of the first actuatable comment indicator from low visibility mode to a high visibility mode during the first user input event.

10. The method of claim 9, further comprising switching, in response to actuation of the first actuatable comment indicator, from a display of the first portion of the first discrete segment in the first region to a display of at least the second portion of the second discrete segment in the first region.

11. The method of claim 10, further comprising displaying the first comment in the second region.

12. The method of claim 10, further comprising:
identifying an availability of a second comment associated with a third portion of a third discrete segment in the sequence of electronic content, the third discrete segment being hidden from view while the second discrete segment is being displayed;
adding, in response to identifying the availability of second comment, a second actuatable comment indicator to the list of comment items, the second actuatable comment indicator being configured to enable a user to navigate to the third portion;
displaying the second actuatable comment indicator in the second region, wherein the second actuatable comment indicator is initially in low visibility mode;
transitioning, in response to a second user input event associated with the second actuatable comment indicator, an appearance of the second actuatable comment indicator from low visibility mode to high visibility mode during the second user input event; and
switching, in response to actuation of the second actuatable comment indicator, from a display of the second discrete segment in the first region to a display of at least the third portion of the third discrete segment in the first region.

13. The method of claim 10, further comprising:
identifying an availability of a second comment associated with the first portion of the first discrete segment in the sequence of electronic content;
adding, in response to identifying the availability of second comment, a second actuatable comment indicator to the list of comment items, the second actuatable comment indicator being configured to enable a user to return to the first portion;
displaying the second actuatable comment indicator in the second region, wherein the second actuatable comment indicator is initially in low visibility mode;
transitioning, in response to second user input event associated with the second actuatable comment indicator, an appearance of the second actuatable comment indicator from low visibility mode to high visibility mode during the second user input event; and
switching, in response to actuation of the second actuatable comment indicator, from a display of the second discrete segment in the first region to a display of at least the first portion of the first discrete segment in the first region.

14. The method of claim 10, wherein the electronic content comprises a database and the first discrete segment and the second discrete segment each correspond to an individual worksheet in the database.

15. The method of claim 10, wherein the electronic content comprises a slideshow and the first discrete segment and the second discrete segment each correspond to an individual slide in the slideshow.

16. The method of claim 9, wherein the second region includes a first end and a second end, and the method further comprises:
presenting the first actuatable comment indicator in the second region proximate to:
the second end of the second region when the second discrete segment is subsequent to the first discrete segment in the sequence, and
the first end of the second region when the second discrete segment is prior to the first discrete segment in the sequence.

17. The method of claim 16, wherein the list of comment items includes a plurality of comments that are associated with the first discrete segment, and the method further comprises:
concealing the first actuatable comment indicator when the plurality of comments being displayed in the second region extends between the first end and the second end.

18. The method of claim 9, wherein the first actuatable comment indicator includes an outline that is initially translucent while in low visibility mode, and the method further comprises:
solidifying, in response to the first user input event associated with the first actuatable comment indicator, the outline of the first actuatable comment indicator when the first actuatable comment indicator is in high visibility mode.

19. The method of claim 9, wherein an interior of the first actuatable comment indicator is blank.

20. The method of claim 9, wherein an interior of the first actuatable comment indicator includes at least one elongated strip symbolizing placeholder text.

* * * * *